United States Patent
Abedini et al.

(10) Patent No.: US 11,902,822 B2
(45) Date of Patent: Feb. 13, 2024

(54) INTER-CU COORDINATION FOR CROSS-LINK INTERFERENCE MANAGEMENT

(71) Applicant: QUALCOMM Incorporated, San Diego, CA (US)

(72) Inventors: Navid Abedini, Basking Ridge, NJ (US); Xipeng Zhu, San Diego, CA (US); Qian Zhang, Basking Ridge, NJ (US); Karl Georg Hampel, Hoboken, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/448,490

(22) Filed: Sep. 22, 2021

(65) Prior Publication Data

US 2022/0104061 A1    Mar. 31, 2022

Related U.S. Application Data

(60) Provisional application No. 63/198,073, filed on Sep. 28, 2020.

(51) Int. Cl.
*H04W 28/02* (2009.01)
*H04W 72/0453* (2023.01)
(Continued)

(52) U.S. Cl.
CPC ....... *H04W 28/0236* (2013.01); *H04W 36/06* (2013.01); *H04W 36/20* (2013.01); *H04W 72/0453* (2013.01)

(58) Field of Classification Search
None
See application file for complete search history.

(56) References Cited

U.S. PATENT DOCUMENTS

2020/0112420 A1 * 4/2020 Xu .............. H04W 72/0446
2020/0169435 A1 * 5/2020 Kang .............. H04L 5/10
(Continued)

FOREIGN PATENT DOCUMENTS

WO    WO-2020146851 A1    7/2020

OTHER PUBLICATIONS

3GPP TR 21.916: "3rd Generation Partnership Project; Technical Specification Group Services and System Aspects; Release 16 Description; Summary of Rel-16 Work Items (Release16)", V0.6.0 (Sep. 2020), 3GPP Draft, CP-202232, 3rd Generation Partnership Project (3GPP), Mobile Competence Centre, 650, Route Des Lucioles, F-06921 Sophia-Antipolis Cedex, France, Sep. 15, 2020 (Sep. 15, 2020), XP051934839, 117 Pages, Retrieved from the Internet: URL:https://ftp.3gpp.org/tsg_ct/TSG_CT/TSGC_89e/Docs/CP-202232.zip, 21916-060.docx [retrieved on Sep. 15, 2020] p. 79, section "CLI handling" p. 79, section "RIM".

(Continued)

*Primary Examiner* — Mohammad S Adhami
(74) *Attorney, Agent, or Firm* — Harrity & Harrity, LLP

(57) ABSTRACT

Various aspects of the present disclosure generally relate to wireless communication. In some aspects, a first base station central unit (CU) may transmit, and a second base station CU may receive, first inter-CU signaling including information related to cross-link interference (CLI) experienced by or to be measured by one or more victim downstream nodes associated with the first base station CU. The second base station CU may configure one or more aggressor downstream nodes to transmit one or more signals based at least in part on the first inter-CU signaling. The second base station CU may transmit, and the first base station CU may receive, second inter-CU signaling indicating a configuration associated with the signals to be transmitted by the one or more aggressor downstream nodes based at least in part (Continued)

on the first inter-CU signaling. Numerous other aspects are provided.

30 Claims, 13 Drawing Sheets

(51) Int. Cl.
*H04W 36/06* (2009.01)
*H04W 36/20* (2009.01)

(56) References Cited

U.S. PATENT DOCUMENTS

2020/0267738 A1    8/2020  Barbu et al.
2022/0095240 A1*  3/2022  Ying .................. H04W 52/243

OTHER PUBLICATIONS

International Search Report and Written Opinion—PCT/US2021/071564—ISA/EPO—dated Jan. 17, 2022.

* cited by examiner

INTER-CU COORDINATION FOR CROSS-LINK INTERFERENCE MANAGEMENT

CROSS-REFERENCE TO RELATED APPLICATION

This patent application claims priority to U.S. Provisional Patent Application No. 63/198,073, filed on Sep. 28, 2020, entitled "INTER-CU COORDINATION FOR CROSS-LINK INTERFERENCE MANAGEMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for inter-central unit (inter-CU) coordination for cross-link interference (CLI) management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first base station central unit (CU) includes receiving, from a second base station CU, inter-CU signaling that includes information related to cross-link interference (CLI) experienced by or to be measured by one or more victim downstream nodes associated with the second base station CU; and configuring one or more aggressor downstream nodes associated with the first base station CU to transmit one or more signals based at least in part on the inter-CU signaling received from the second base station CU.

In some aspects, a method of wireless communication performed by a first base station CU includes transmitting, to a second base station CU, first inter-CU signaling that includes information related to CLI experienced by or to be measured by one or more victim downstream nodes associated with the first base station CU; and receiving, from the second base station CU, second inter-CU signaling indicating a configuration associated with one or more signals to be transmitted by one or more aggressor downstream nodes associated with the second base station CU based at least in part on the first inter-CU signaling.

In some aspects, a first base station CU for wireless communication includes a memory; and one or more processors, coupled to the memory, configured to: receive, from a second base station CU, inter-CU signaling that includes information related to CLI experienced by or to be measured by one or more victim downstream nodes associated with the second base station CU; and configure one or more aggressor downstream nodes associated with the first base station CU to transmit one or more signals based at least in part on the inter-CU signaling received from the second base station CU.

In some aspects, a first base station CU for wireless communication includes a memory; and one or more processors, coupled to the memory, configured to: transmit, to a second base station CU, first inter-CU signaling that includes information related to CLI experienced by or to be measured by one or more victim downstream nodes associated with the first base station CU; and receive, from the second base station CU, second inter-CU signaling indicating a configuration associated with one or more signals to be transmitted by one or more aggressor downstream nodes associated with the second base station CU based at least in part on the first inter-CU signaling.

In some aspects, a non-transitory computer-readable medium storing a set of instructions for wireless communication includes one or more instructions that, when executed by one or more processors of a first base station CU, cause the first base station CU to: receive, from a second base station CU, inter-CU signaling that includes information related to CLI experienced by or to be measured by one or more victim downstream nodes associated with the second base station CU; and configure one or more aggressor downstream nodes associated with the first base station CU to transmit one or more signals based at least in part on the inter-CU signaling received from the second base station CU.

In some aspects, a non-transitory computer-readable medium storing a set of instructions for wireless communication includes one or more instructions that, when executed by one or more processors of a first base station central unit (CU), cause the first base station CU to: transmit, to a second base station CU, first inter-CU signaling that includes information related to CLI experienced by or to be measured by one or more victim downstream nodes associated with the first base station CU; and receive, from the second base station CU, second inter-CU signaling indicating a configuration associated with one or more signals to be transmitted by one or more aggressor downstream nodes associated with the second base station CU based at least in part on the first inter-CU signaling.

In some aspects, an apparatus for wireless communication includes means for receiving, from a base station CU, inter-CU signaling that includes information related to CLI experienced by or to be measured by one or more victim downstream nodes associated with the base station CU; and means for configuring one or more aggressor downstream nodes associated with the apparatus to transmit one or more signals based at least in part on the inter-CU signaling received from the base station CU.

In some aspects, an apparatus for wireless communication includes means for transmitting, to a base station CU, first inter-CU signaling that includes information related to CLI experienced by or to be measured by one or more victim downstream nodes associated with the apparatus; and means for receiving, from the base station CU, second inter-CU signaling indicating a configuration associated with one or more signals to be transmitted by one or more aggressor downstream nodes associated with the base station CU based at least in part on the first inter-CU signaling.

Aspects generally include a method, apparatus, system, computer program product, non-transitory computer-readable medium, user equipment, base station, central unit, distributed unit, mobile terminal, node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
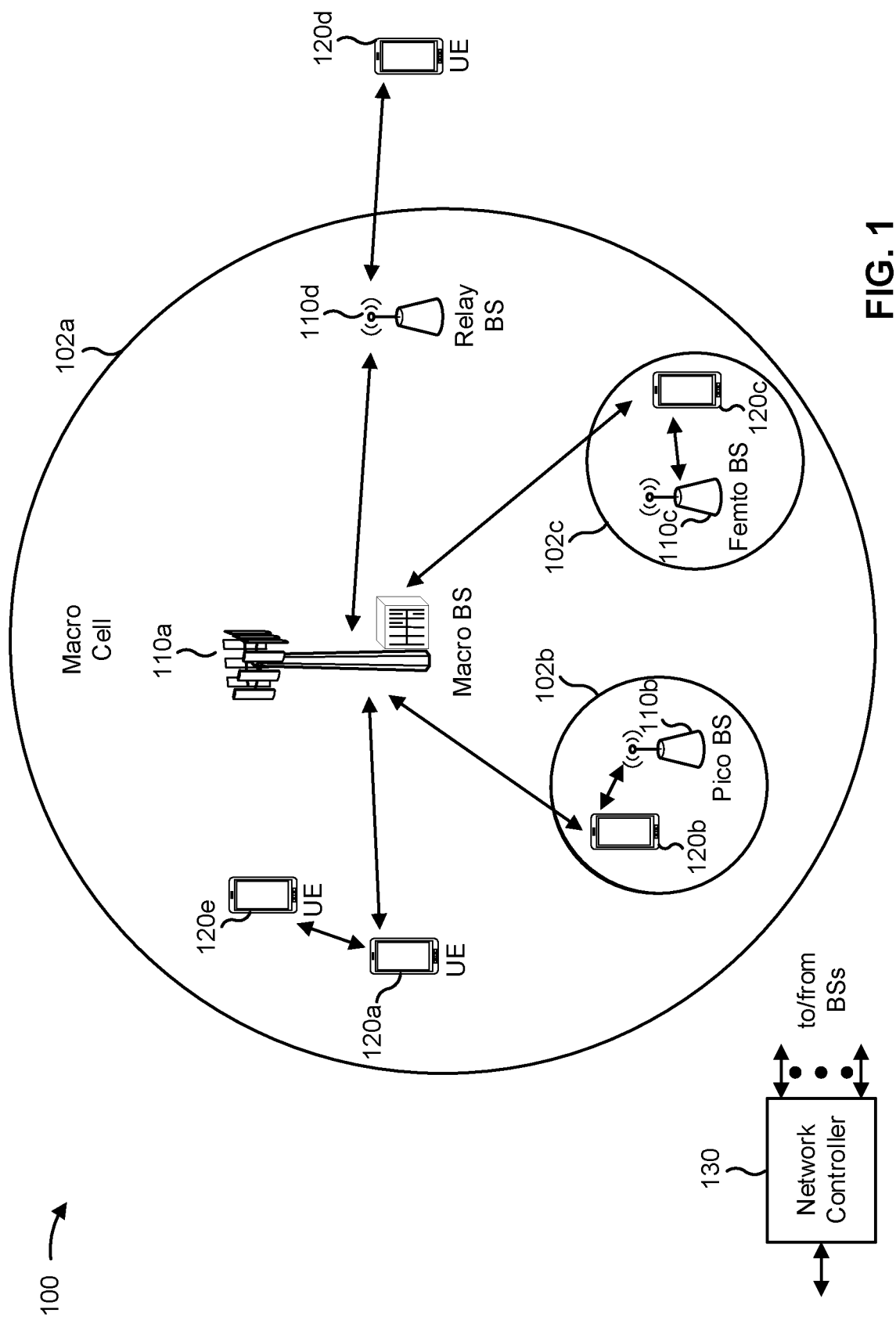
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
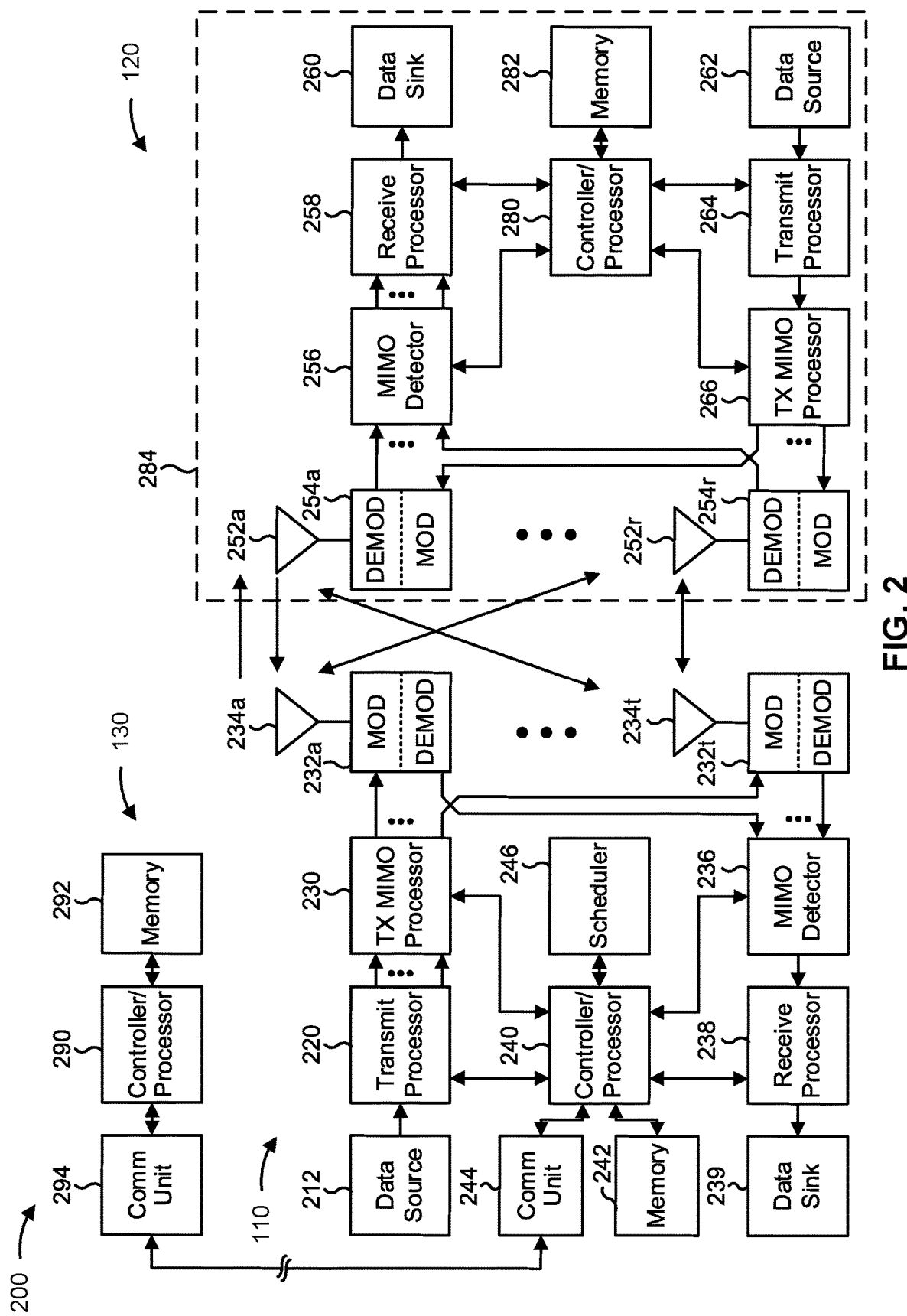
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8A-8B, FIG. 9, and/or FIG. 10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8A-8B, FIG. 9, and/or FIG. 10).

Controller/processor 240 of base station 110, controller/processor 280 of UE 120, and/or any other component(s) of FIG. 2 may perform one or more techniques associated with inter-central unit (inter-CU) coordination for cross-link interference (CLI) management, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the base station 110 includes means for receiving, from a base station central unit (CU), inter-CU signaling that includes information related to CLI experienced by or to be measured by one or more victim downstream nodes associated with the base station CU; and/or means for configuring one or more aggressor downstream nodes associated with the base station 110 to transmit one or more signals based at least in part on the inter-CU signaling received from the base station CU. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for transmitting, to the base station CU, inter-CU signaling indicating a configuration associated with the one or more signals to be transmitted by the one or more aggressor downstream nodes.

In some aspects, the base station 110 includes means for receiving, from the base station CU, inter-CU signaling that includes feedback related to the CLI measured by the one or more victim downstream nodes.

In some aspects, the base station 110 includes means for performing one or more actions to mitigate the CLI measured by the one or more victim downstream nodes based at least in part on the feedback.

In some aspects, the base station 110 includes means for transmitting, to a base station CU, first inter-CU signaling that includes information related to CLI experienced by or to be measured by one or more victim downstream nodes associated with the base station 110; and/or means for receiving, from the base station CU, second inter-CU signaling indicating a configuration associated with one or more signals to be transmitted by one or more aggressor downstream nodes associated with the second base station CU based at least in part on the first inter-CU signaling.

In some aspects, the base station 110 includes means for configuring the one or more victim downstream nodes to perform one or more CLI measurements based at least in part on the second inter-CU signaling.

In some aspects, the base station 110 includes means for transmitting, to the base station CU, inter-CU signaling that includes feedback related to the CLI measured by the one or more victim downstream nodes.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
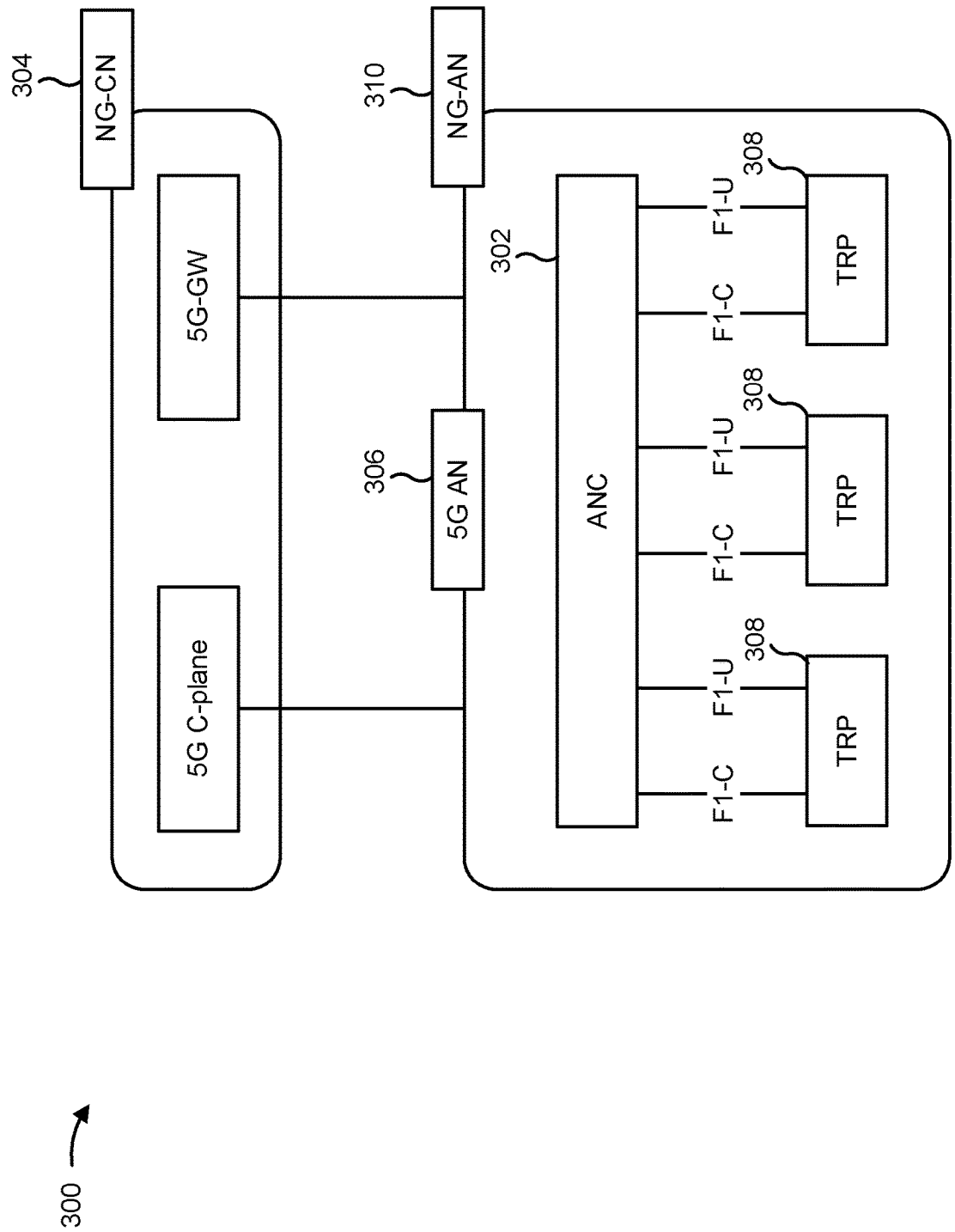
FIG. 3 illustrates an example logical architecture of a distributed radio access network (RAN), in accordance with the present disclosure.

FIG. 3 illustrates an example logical architecture of a distributed radio access network (RAN) 300, in accordance with the present disclosure. A 5G access node 306 may include an access node controller (ANC) 302. The ANC 302 may be a base station central unit (CU) of the distributed RAN 300. In some aspects, a backhaul interface to a next generation core network (NG-CN) 304 may terminate at the ANC 302. The backhaul interface to neighboring next generation access nodes (NG-ANs) 310 may terminate at the ANC 302.

In some aspects, the ANC 302 may include one or more TRPs 308 (which may also be referred to as BSs, NR BSs, Node Bs, 5G NBs, APs, gNB, or some other term). As described above, "TRP" may be used interchangeably with "cell." The TRPs 308 may be a base station DU. The TRPs 308 may be connected to one ANC (e.g., ANC 302) or to more than one ANC (not illustrated). For example, for RAN sharing, radio as a service (RaaS), and service specific ANC deployments, a TRP 308 may be connected to more than one ANC 302. A TRP 308 may include one or more antenna ports. The TRPs 308 may be configured to serve traffic to a UE individually (e.g., using dynamic selection) or jointly (e.g., using joint transmission).

The local architecture of RAN 300 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to some aspects, the NG-AN 310 may support dual connectivity with NR. The NG-AN 310 may share a common fronthaul for LTE and NR.

The architecture may enable cooperation between and among TRPs 308. For example, cooperation may be preset within a TRP 308 and/or across TRPs 308 via the ANC 302. According to aspects, no inter-TRP interface may be needed or present.

According to some aspects, a dynamic configuration of split logical functions may be present within the architecture of RAN 300. The packet data convergence protocol (PDCP), radio link control (RLC), or medium access control (MAC) protocol may be adaptably placed at the ANC or TRP.

According to some aspects, a base station may include a CU (e.g., ANC 302) and/or one or more DUs (e.g., one or more TRPs 308).

As indicated above, FIG. 3 is provided as an example. Other examples may differ from what is described with regard to FIG. 3.

Figure 4:
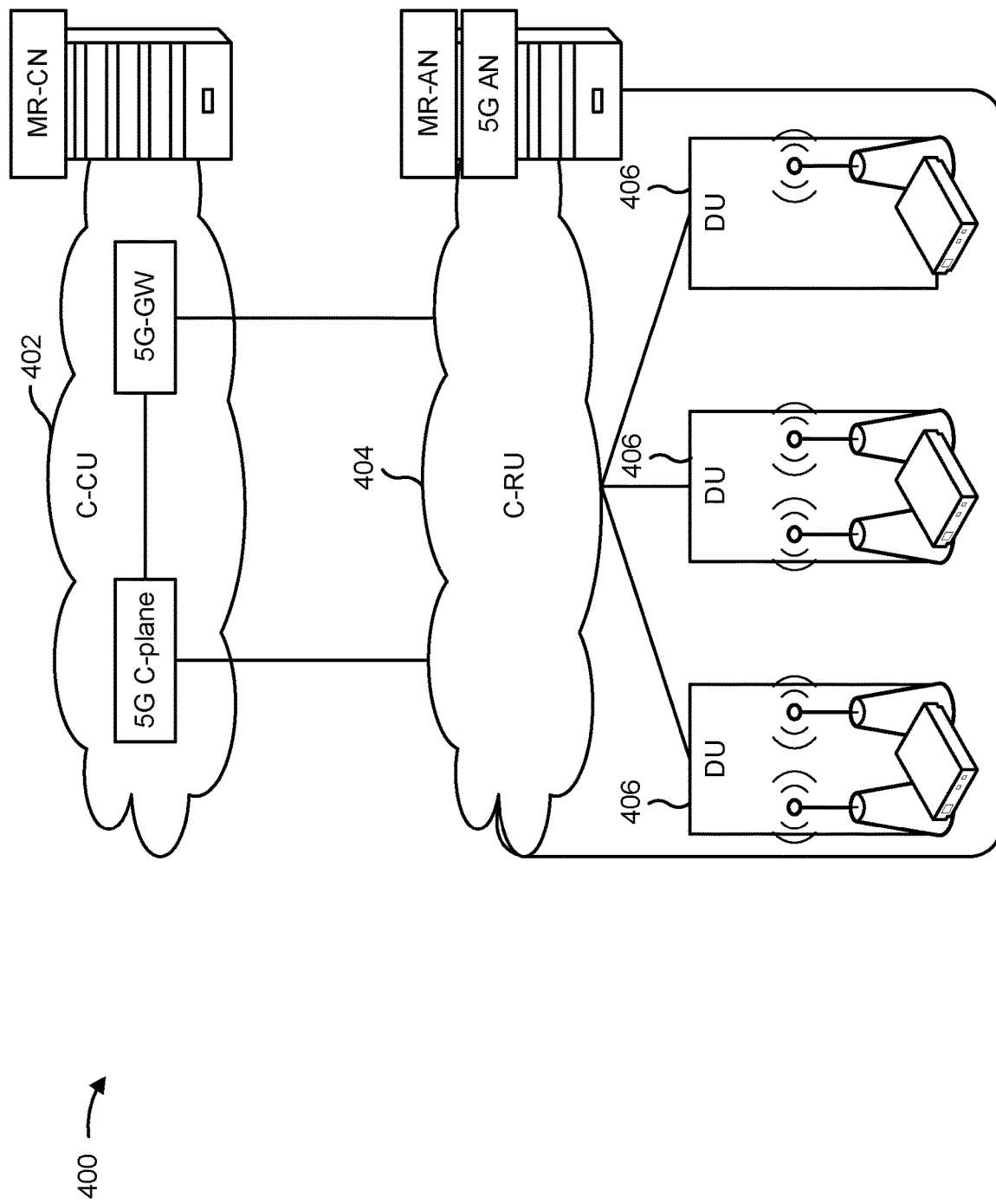
FIG. 4 illustrates an example physical architecture of a distributed RAN, in accordance with the present disclosure.

FIG. 4 illustrates an example physical architecture of a distributed RAN 400, in accordance with the present disclosure. As shown in FIG. 4, a centralized core network unit (C-CU) 402 may host core network functions. The C-CU 402 may be centrally deployed. Functionality of the C-CU 402 may be offloaded (e.g., to advanced wireless services (AWS)), in an effort to handle peak capacity.

A centralized RAN unit (C-RU) 404 (which may also be referred to as a base station CU) may host one or more ANC functions. Optionally, the C-RU 404 may host core network functions locally. The C-RU 404 may have distributed deployment. The C-RU 404 may be closer to the network edge.

A base station DU 406 may host one or more TRPs. The base station DU 406 may be located at edges of the network with radio frequency (RF) functionality.

As indicated above, FIG. 4 is provided as an example. Other examples may differ from what is described with regard to FIG. 4.

Figure 5:
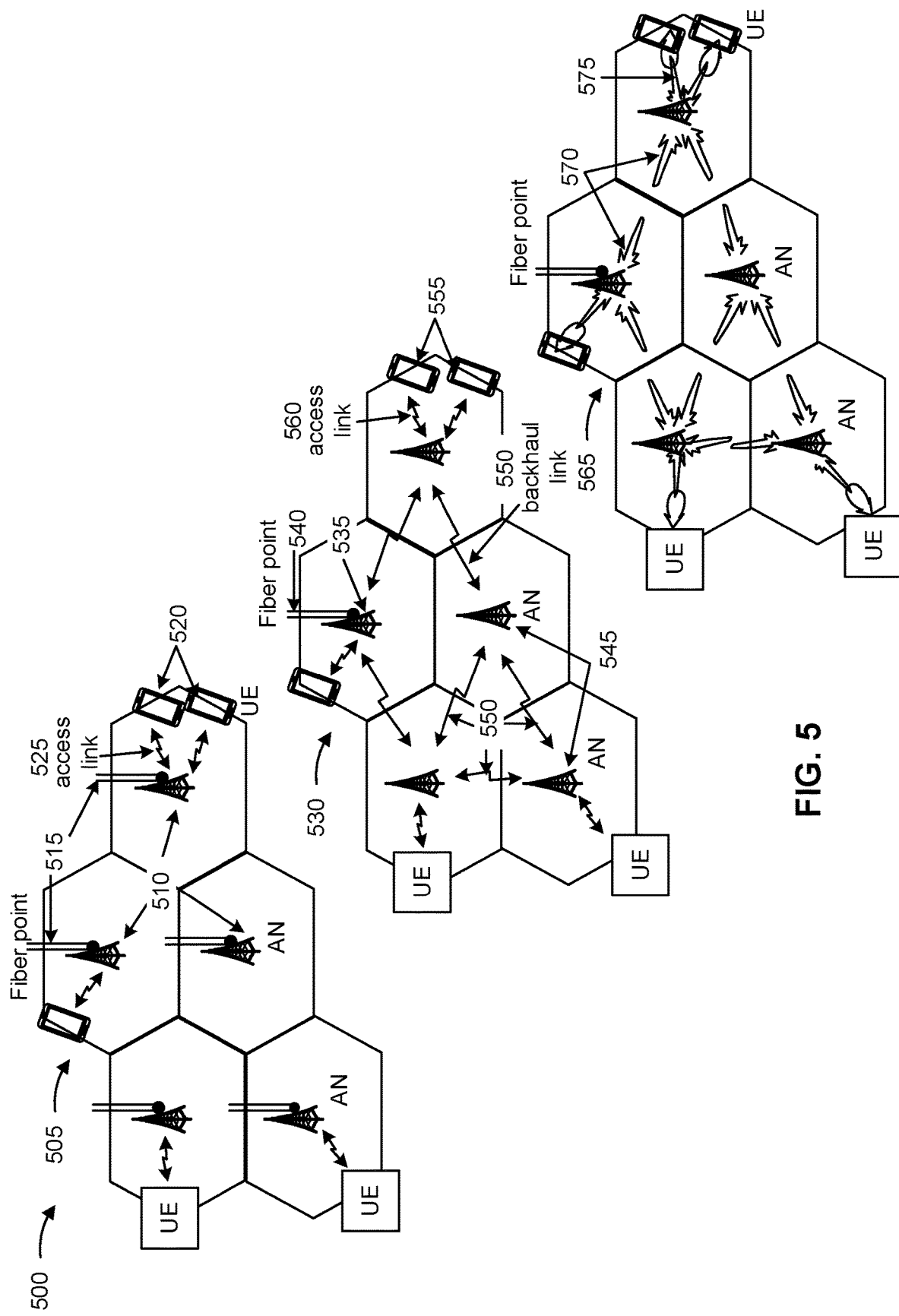
FIG. 5 is a diagram illustrating examples of RANs, in accordance with the present disclosure.

FIG. 5 is a diagram illustrating examples 500 of radio access networks, in accordance with the present disclosure.

As shown by reference number 505, a traditional (e.g., 3G, 4G, LTE, and/or the like) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may be a base station 110 shown in FIG. 1. In some aspects, a UE 520 shown in FIG. 5 may be a UE 120 shown in FIG. 1.

As shown by reference number 530, a radio access network may include a wireless backhaul network, sometimes referred to as an integrated access and backhaul (IAB) network. In an IAB network, at least one base station is an anchor base station 535 that communicates with a core network via a wired backhaul link 540, such as a fiber connection. An anchor base station 535 may also be referred to as an IAB donor (or IAB-donor). The IAB network may include one or more non-anchor base stations 545, sometimes referred to as relay base stations or IAB nodes (or IAB-nodes). The non-anchor base station 545 may communicate directly or indirectly with the anchor base station 535 via one or more backhaul links 550 (e.g., directly communicating with the anchor base station 535 or communicating via one or more non-anchor base stations 545) to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may be a base station 110 shown in FIG. 1. In some aspects, a UE 555 shown in FIG. 5 may be a UE 120 shown in FIG. 1.

As shown by reference number 565, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 570 between base stations may use millimeter wave signals to carry information and/or may be directed toward a target base station using beamforming and/or the like. Similarly, the wireless access links 575 between a UE and a base station may use millimeter wave signals and/or may be directed toward a target wireless node (e.g., a UE and/or a base station). In this way, cross-link interference may be reduced.

The configuration of base stations and UEs in FIG. 5 is shown as an example, and other examples are contemplated. For example, one or more base stations illustrated in FIG. 5 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 5 is provided as an example. Other examples may differ from what is described with regard to FIG. 5.

Figure 6:
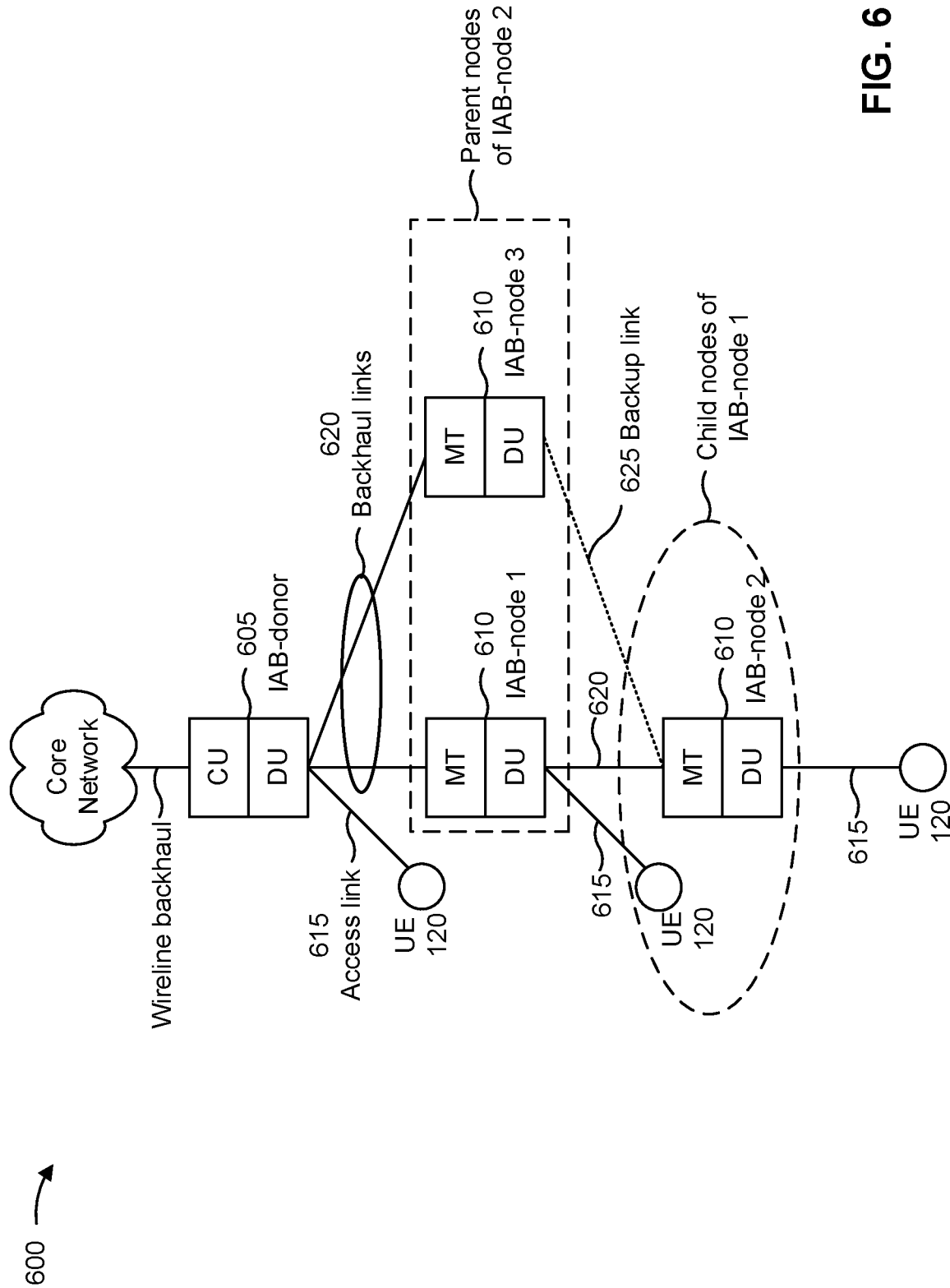
FIG. 6 is a diagram illustrating an example of an integrated access and backhaul (IAB) network architecture, in accordance with the present disclosure.

FIG. 6 is a diagram illustrating an example 600 of an IAB network architecture, in accordance with the present disclosure.

As shown in FIG. 6, an IAB network may include an IAB donor 605 (shown as IAB-donor) that connects to a core network via a wired connection (shown as a wireline backhaul). For example, an Ng interface of an IAB donor 605 may terminate at a core network. Additionally, or alternatively, an IAB donor 605 may connect to one or more devices of the core network that provide a core access and mobility management function (e.g., AMF). In some aspects, an IAB donor 605 may include a base station 110, such as an anchor base station, as described above in connection with FIG. 5. As shown, an IAB donor 605 may include a CU, which may perform ANC functions, AMF functions, and/or the like. The CU may configure a DU of the IAB donor 605 and/or may configure one or more IAB nodes 610 (e.g., an MT and/or a DU of an IAB node 610) that connect to the core network via the IAB donor 605. Thus, a CU of an IAB donor 605 may control and/or configure the entire IAB network that connects to the core network via the IAB donor 605, such as by using control messages and/or configuration messages (e.g., a radio resource control (RRC) configuration message, an F1 application protocol (FLAP) message, and/or the like).

As further shown in FIG. 6, the IAB network may include IAB nodes 610 (shown as IAB-node 1, IAB-node 2, and IAB-node 3) that connect to the core network via the IAB donor 605. As shown, an IAB node 610 may include mobile termination (MT) functions (also sometimes referred to as UE functions (UEF)) and may include DU functions (also sometimes referred to as access node functions (ANF)). The MT functions of an IAB node 610 (e.g., a child node) may be controlled and/or scheduled by another IAB node 610 (e.g., a parent node of the child node) and/or by an IAB donor 605. The DU functions of an IAB node 610 (e.g., a parent node) may control and/or schedule other IAB nodes 610 (e.g., child nodes of the parent node) and/or UEs 120. Thus, a DU may be referred to as a scheduling node or a scheduling component, and an MT may be referred to as a scheduled node or a scheduled component. In some aspects, an IAB donor 605 may include DU functions and not MT functions. That is, an IAB donor 605 may configure, control, and/or schedule communications of IAB nodes 610 and/or UEs 120. A UE 120 may include only MT functions, and not DU functions. That is, communications of a UE 120 may be controlled and/or scheduled by an IAB donor 605 and/or an IAB node 610 (e.g., a parent node of the UE 120).

When a first node controls and/or schedules communications for a second node (e.g., when the first node provides DU functions for the MT functions of the second node), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 605 or an IAB node 610, and a child node may be an IAB node 610 or a UE 120. Communications of an MT function of a child node may be controlled and/or scheduled by a parent node of the child node.

As further shown in FIG. 6, a link between a UE 120 (e.g., which only has MT functions, and not DU functions) and an IAB donor 605, or between a UE 120 and an IAB node 610, may be referred to as an access link 615. Access link 615 may be a wireless access link that provides a UE 120 with radio access to a core network via an IAB donor 605, and optionally via one or more IAB nodes 610. Thus, the network illustrated in FIG. 6 may be referred to as a multi-hop network or a wireless multi-hop network.

As further shown in FIG. 6, a link between an IAB donor 605 and an IAB node 610 or between two IAB nodes 610 may be referred to as a backhaul link 620. Backhaul link 620 may be a wireless backhaul link that provides an IAB node 610 with radio access to a core network via an IAB donor 605, and optionally via one or more other IAB nodes 610. In an IAB network, network resources for wireless communications (e.g., time resources, frequency resources, spatial resources, and/or the like) may be shared between access links 615 and backhaul links 620. In some aspects, a backhaul link 620 may be a primary backhaul link or a secondary backhaul link (e.g., a backup backhaul link). In some aspects, a secondary backhaul link 625 may be used if a primary backhaul link 620 fails, becomes congested, becomes overloaded, and/or the like. For example, a secondary backhaul link 625 between IAB-node 2 and IAB-node 3 may be used for backhaul communications if the primary backhaul link between IAB-node 2 and IAB-node 1 fails. As used herein, "node" or "wireless node" may refer to an IAB donor 605 or an IAB node 610.

As indicated above, FIG. 6 is provided as an example. Other examples may differ from what is described with regard to FIG. 6.

Figure 7:
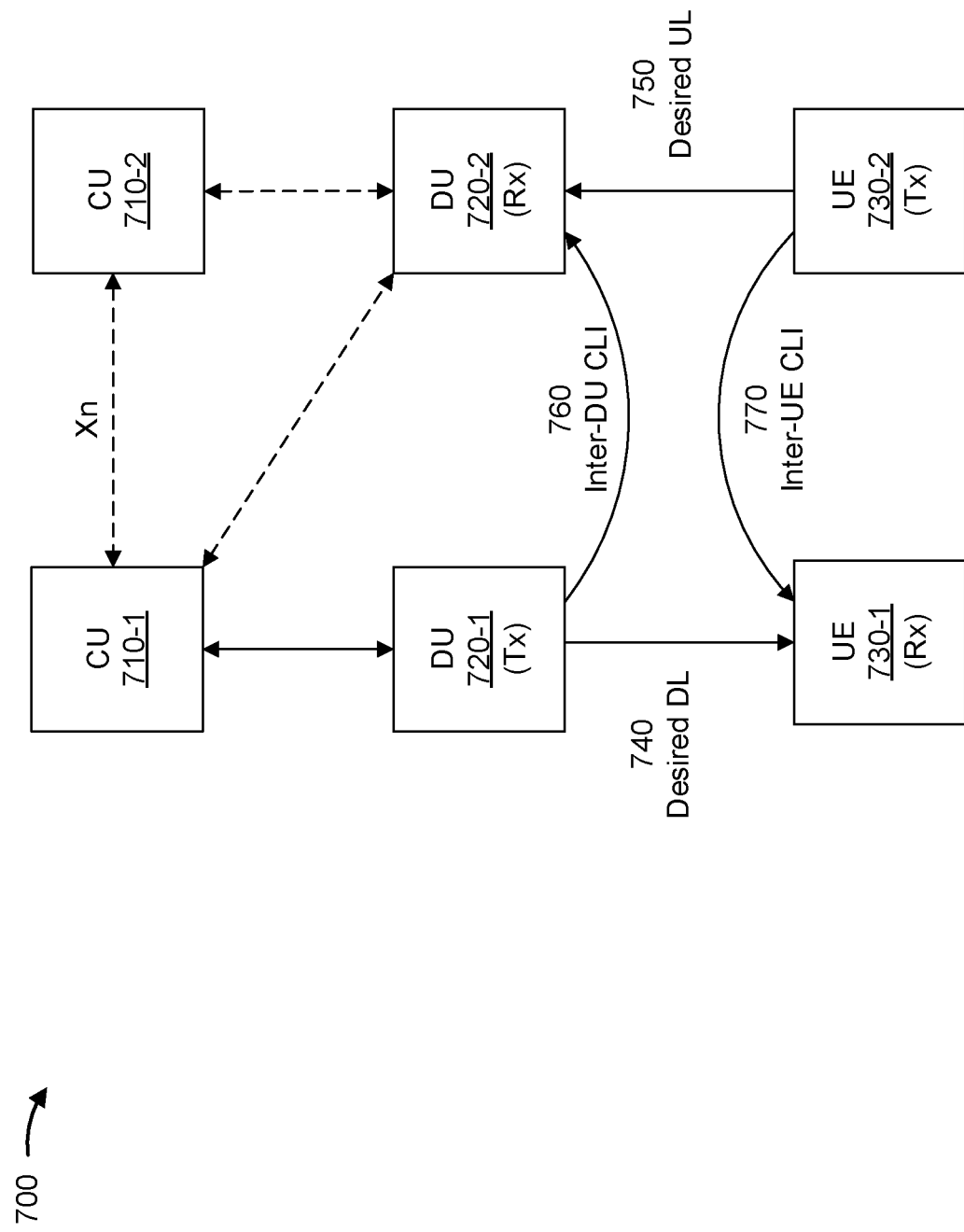
FIG. 7 is a diagram illustrating examples relating to cross-link interference (CLI), in accordance with the present disclosure.

FIG. 7 is a diagram illustrating examples 700 relating to cross-link interference (CLI), in accordance with various aspects of the present disclosure.

In dynamic time division duplexing (TDD), the allocation of network resources to uplink and downlink may be dynamically modified depending on a traffic load. For example, a base station CU 710 may configure a TDD configuration (e.g., a TDD pattern) with more uplink transmission time intervals (TTIs) (e.g., frames, subframes, slots, mini-slots, symbols, and/or the like) for a downstream node (e.g., a base station DU 720 associated with the base station CU 710, a UE 730 served by the base station 720, a mobile terminal (MT) or child node associated with an IAB node, and/or the like) when the downstream node has uplink data to transmit, and may configure a TDD configuration with more downlink TTIs for the downstream node when the downstream node has downlink data to receive. The TDD configuration may be dynamically configured to modify the allocation of uplink TTIs and downlink TTIs used for communication between base station CUs 710, base station DUs 720 and associated IAB child nodes, UEs 730, and/or IAB parent nodes.

As shown in FIG. 7, when neighboring base stations 720 use different TDD configurations to communicate with downstream UEs 730 (or other downstream nodes, such as child IAB nodes), this may result in a downlink communication 740 between a first base station DU 720-1 and a first UE 730-1 that at least partially overlaps in the time domain an uplink communication 750 between a second base station DU 720-2 and a second UE 730-2 (e.g., the downlink communication 740 and the uplink communication 750 occur in a same TTI). These communications in different transmission directions (e.g., downlink vs. uplink) in the same TTI may interfere with one another, which may be referred to as inter-DU CLI.

For example, as shown by reference number 760, the downlink communication 740 transmitted by the first base station DU 720-1 may be received by the second base station DU 720-2, and may interfere with reception, by the second base station DU 720-2, of the uplink communication 750 from the second UE 730-2. This may be referred to as downlink-to-uplink (DL-to-UL) interference, base station to base station interference, gNB to gNB interference, inter-DU CLI, and/or the like.

Further, as shown by reference number 770, the uplink communication 750 transmitted by the second UE 730-2 may be received by the first UE 730-1, and may interfere with reception, by the first UE 730-1, of the downlink communication 740 from the first base station DU 720-1. This may be referred to as uplink-to-downlink (UL-to-DL) interference, UE-to-UE interference, inter-UE CLI, and/or the like. This inter-UE CLI may occur and/or may increase when the first UE 730-1 and the second UE 730-2 are in close proximity, and may be avoided or mitigated by preventing scheduling of the UEs 730 in different transmission directions in the same TTI.

Inter-DU CLI 760 and/or inter-UE CLI 770 can result in reception issues for downlink communication 740 and/or uplink communication 750, such as a reduced receive power for downlink communication 740 and/or uplink communication 750, difficulty in demodulating downlink communication 740 and/or uplink communication 750, decoding errors for downlink communication 740 and/or uplink communication 750, and/or other issues. These and other reception issues can result in dropped or unreceivable communications at victim nodes (e.g., base station DU 720-2 and/or UE 730-1) experiencing CLI caused by aggressor nodes (e.g., base station DU 720-1 and/or UE 730-2), which can cause reception delays, reduce reliability, and/or an increase in retransmissions (which consumes additional power, memory, processing, and radio resources of the victim nodes and the nodes performing the retransmissions).

Accordingly, in some cases, a base station CU 710 may configure one or more downstream nodes to perform and report one or more CLI measurements in order to detect and/or mitigate inter-DU CLI and/or inter-UE CLI. For example, UE-to-UE CLI measurements may be based on sounding reference signal (SRS) transmissions or CLI received signal strength indicator (CLI-RSSI) transmissions, which may be configured by RRC signaling (e.g., using a CLI measurement object, such as a MeasObjectCLI information element). In such cases, the base station CU 710 may receive a Layer 3 (L3) CLI measurement report from a downstream UE 730, whereby CLI detection and mitigation is controlled by the base station CU 710 and is transparent to base station DUs 720 that are downstream nodes of the base station CU 710. For example, a base station CU 710 may mitigate CLI caused by or experienced by a downstream node by configuring dedicated TDD patterns in which neighboring downstream nodes are not scheduled in different transmission directions in the same TTI. Additionally, or alternatively, the base station CU 710 may configure one or more handover parameters, power control parameters, and/or other communication parameters to mitigate CLI caused by or experienced by a downstream node. Additionally, or alternatively, the base station CU 710 may provide a downstream base station DU 720 with an intended TDD configuration of neighboring cells, which the base station DU 720 may take into account to avoid or mitigate downstream CLI (e.g., inter-UE CLI) when scheduling downstream UEs 730, downstream IAB child nodes, and/or the like.

However, efforts to detect and/or mitigate CLI in a wireless network may be hampered in cases where CLI occurs between downstream nodes that are associated with different base station CUs 710. For example, as shown in FIG. 7, the first base station DU 720-1 and the second base station DU 720-2 may be associated with the same base station CU 710 (e.g., base station CU 710-1), or the base station DUs 720-1, 720-2 may be associated with different base station CUs 710-1, 710-2 that are configured to communicate over an Xn interface. In the latter case, where the base station DUs 720-1, 720-2 are associated with different base station CUs 710-1, 710-2, the base station CUs 710-1, 710-2 may be unable to detect and mitigate the inter-DU CLI and/or the inter-CU CLI because there is no standardized signaling between two base station CUs 710 to exchange information required to configure CLI measurement objects for a downstream node (e.g., a UE, an MT associated with an IAB node, a DU cell, and/or a DU associated with an TAB node) that intends to measure CLI from another downstream node that is connected to a different CU 710.

Some aspects described herein relate to inter-CU signaling that may enable inter-CU CLI management (e.g., CLI detection and/or mitigation between downstream nodes that are connected to different base station CUs). For example, in some aspects, a first base station CU may transmit, and a second base station CU may receive, first inter-CU signaling including information related to CLI experienced by or to be measured by one or more victim downstream nodes associated with the first base station CU. The second base station CU may configure one or more aggressor downstream nodes to transmit one or more signals based at least in part on the first inter-CU signaling, and the second base station CU may transmit, to the first base station CU, second inter-CU signaling that indicates a configuration associated with the signals to be transmitted by the one or more aggressor downstream nodes. Accordingly, the first base station CU may configure the one or more victim downstream nodes to perform one or more CLI measurements based at least in part on the configuration associated with the signals to be transmitted by the one or more aggressor downstream nodes, and may provide feedback related to the CLI measurements performed by the victim downstream nodes to the second base station CU. In this way, the first base station CU and the second base station CU may coordinate efforts to detect and/or mitigate inter-DU CLI, inter-UE CLI, and/or other CLI experienced by and/or caused by downstream nodes that are associated with the respective base station CUs.

As indicated above, FIG. 7 is provided as an example. Other examples are possible and may differ from what was described with respect to FIG. 7.

Figure 8A:
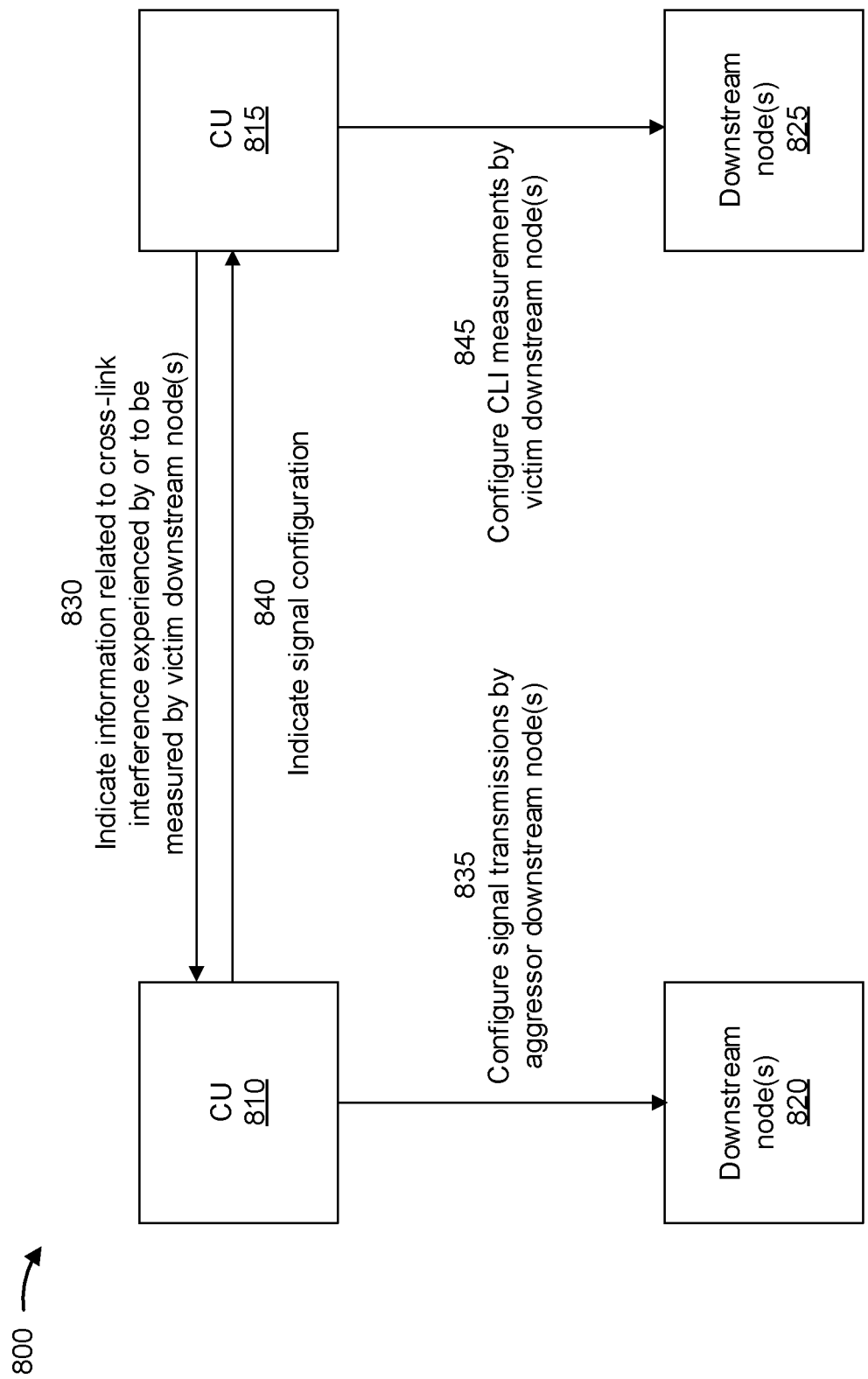
FIGS. 8A-8B are diagrams illustrating examples associated with inter-central unit (inter-CU) coordination for CLI management, in accordance with the present disclosure.
Figure 8B:
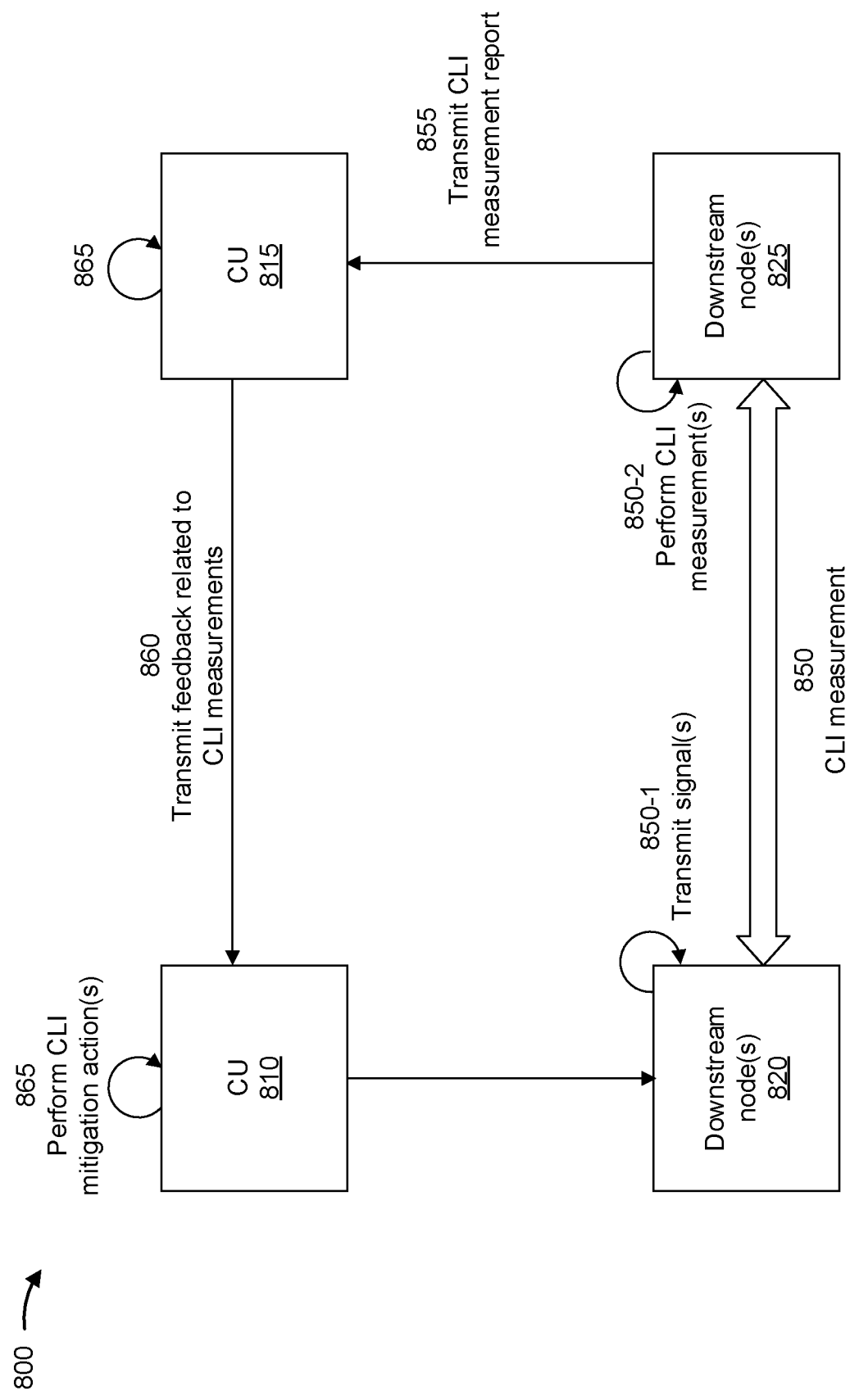

FIGS. 8A-8B are diagrams illustrating examples 800 associated with inter-central unit (inter-CU) coordination for CLI management, in accordance with the present disclosure. As shown in FIGS. 8A-8B, examples 800 include a first base station CU 810 (shown as and described herein as first CU 810) and a second base station CU 815 (shown as and described herein as second CU 815) that may be configured to communicate over an Xn interface. As further shown in FIGS. 8A-8B, the first CU 810 may be associated with one or more downstream nodes 820, which may include a UE, a mobile terminal (MT) associated with an TAB node, a base station DU, and/or a DU associated with an TAB node, among other examples. Similarly, the second CU 815 may be associated with one or more downstream nodes 825, which may include a UE, an MT associated with an TAB node, a base station DU, and/or a DU associated with an IAB node, among other examples. In some aspects, as described herein, the first CU 810 and the second CU 815 may communicate inter-CU signaling over the Xn interface to enable CLI measurements by the respective downstream nodes 820, 825, to detect and/or mitigate CLI between the respective downstream nodes 820, 825, and/or the like.

As shown in FIG. 8A, and by reference number 830, the second CU 815 may transmit, and the first CU 810 may receive, inter-CU signaling that indicates information related to CLI experienced by or to be measured by one or more downstream nodes 825 that are connected to the second CU 815. For example, as described herein, the downstream nodes 825 connected to the second CU 815 may experience or have a need to measure CLI potentially caused by one or more downstream nodes 820 connected to the first CU 810. Accordingly, the one or more downstream nodes 825 experiencing and/or measuring CLI may be referred to herein as victim downstream nodes 825, and the one or more downstream nodes 825 potentially causing the CLI experienced by and/or to be measured by the victim downstream nodes 825 may be referred to herein as aggressor downstream nodes 820.

As further shown in FIG. 8A, and by reference number 835, the first CU 810 may configure one or more signal transmissions by the aggressor downstream nodes 820 based at least in part on the inter-CU signaling related to the CLI experienced by or to be measured by the victim downstream nodes 825. For example, in some aspects, the inter-CU signaling transmitted by the second CU 815 and received by the first CU 810 may indicate one or more time and/or frequency resources that the victim downstream nodes 825 (e.g., downstream UEs, MTs, and/or DU cells, among other examples) are configured to use to perform CLI measurements.

Accordingly, in some aspects, the first CU 810 may configure the aggressor downstream nodes 820 to perform one or more signal transmissions using the time and/or frequency resources indicated in the inter-CU signaling received from the second CU 815. For example, in cases where the aggressor downstream nodes 820 include UEs and/or MTs, the aggressor downstream nodes 820 may be configured to perform one or more CLI-RSSI transmissions (e.g., physical uplink shared channel transmissions (PUSCH) transmissions and/or physical uplink control channel (PUCCH) transmissions) and/or uplink reference signal transmissions (e.g., SRS transmissions) using the time and/or frequency resources indicated in the inter-CU signaling received from the second CU 815.

Additionally, or alternatively, in cases where the aggressor downstream nodes 820 include one or more base station DUs or DU cells, the aggressor downstream nodes 820 may be configured to perform one or more CLI-RSSI transmissions (e.g., physical downlink shared channel transmissions (PDSCH) and/or physical downlink control channel (PDCCH) transmissions) and/or downlink reference signal transmissions (e.g., synchronization signal block (SSB) transmissions, channel state information reference signal (CSI-RS) transmissions, remote interference management reference signal (RIM-RS) transmissions, and/or the like) using the time and/or frequency resources indicated in the inter-CU signaling.

Additionally, or alternatively, the inter-CU signaling transmitted by the second CU 815 and received by the first CU 810 may indicate one or more identifiers associated with the first CU 810 that represent potential sources of CLI experienced by the victim downstream nodes 825. For example, in some aspects, the inter-CU signaling may indicate one or more cell identifiers, one or more UE identifiers, one or more zone identifiers, one or more location identifiers, one or more spatial regions (e.g., SSB indexes associated with the cell identifiers) associated with the first CU 810. Accordingly, based on the inter-CU signaling indicating the identifiers that represent potential sources of CLI experienced by the victim downstream nodes 825, the first CU 810 may determine the aggressor downstream nodes 820 that are associated with the identifiers indicated in the inter-CU signaling and may configure such aggressor downstream nodes 820 to perform one or more reference signal transmissions and/or CLI-RSSI transmissions.

As further shown in FIG. 8A, and by reference number 840, the first CU 810 may transmit, and the second CU 815 may receive, inter-CU signaling that indicates configuration information associated with the one or more signals that the aggressor downstream nodes 820 are configured to transmit. For example, in some aspects, the configuration information may indicate the time and/or frequency resources that the aggressor downstream nodes 820 are configured to use to transmit the reference signal and/or CLI-RSSI transmissions (which may be the same as the time and/or frequency resources indicated in the inter-CU signaling from the second CU 815 to the first CU 810). Furthermore, in some aspects, the configuration information may indicate various other communication parameters associated with the reference signal and/or CLI-RSSI transmissions to be performed by the aggressor downstream nodes 820, such as a beam identifier, a subcarrier spacing, a periodicity and offset, and/or the like). In other words, the first CU 810 may indicate the resources (e.g., time and/or frequency resources) and/or configuration information that the victim downstream nodes 825 connected to the second CU 815 are to use to perform CLI measurements. Accordingly, as further shown in FIG. 8A, and by reference number 845, the second DU 815 may configure the one or more victim downstream nodes 825 to perform one or more CLI measurements based at least in part on the resources and/or configuration information associated with the reference signal and/or CLI-RSSI transmissions to be performed by the aggressor downstream nodes 820, as indicated in the inter-CU signaling from the first CU 810. For example, in some aspects, the second CU 815 may configure one or more CLI measurement objects for the victim downstream nodes 825.

As shown in FIG. 8B, and by reference number 850, a CLI measurement session may be performed between the aggressor downstream nodes 820 and the victim downstream nodes 825. For example, as shown by reference number 850-1, the aggressor downstream nodes 820 may perform one or more reference signal and/or CLI-RSSI transmissions that are configured by the first CU 810 based at least in part on the inter-CU signaling provided by the second CU 815 (e.g., the inter-CU signaling indicating the time and/or frequency resources to be used for CLI measurements by the victim downstream nodes 825, identifiers associated with the first CU 810 that represent potential sources of CLI experienced by the victim downstream nodes 825, and/or the like). Furthermore, as shown by reference number 850-2, the victim downstream nodes 825 may perform CLI measurements by measuring the one or more reference signal and/or CLI-RSSI transmissions by the aggressor downstream nodes 820 based at least in part on the inter-CU signaling provided by the first CU 810 (e.g., the inter-CU signaling indicating the time and/or frequency resources to be used for CLI measurements by the victim downstream nodes 825 and/or the configuration information for the reference signal and/or CLI-RSSI transmissions by the aggressor downstream nodes 820). Accordingly, as further shown in FIG. 8B, and by reference number 855, the victim downstream nodes 825 may transmit, to the second CU 815, one or more CLI measurement reports that include one or more signal measurements associated with the reference signal and/or CLI-RSSI transmissions by the aggressor downstream nodes 820. For example, in some aspects, the CLI measurement reports may include RSSI measurements, RSRP measurements, RSRQ measurements, CQI measurements, signal-to-noise (SNR) measurements, signal to interference plus noise (SINR) measurements, and/or other suitable signal measurements.

As further shown in FIG. 8B, and by reference number 860, the second CU 815 may transmit, to the first CU 810, feedback related to the CLI measurements reported by the victim downstream nodes 825. For example, in some aspects, the feedback may include the CLI measurement reports that are associated with signal transmissions by one or more UEs, MTs, DU cells, and/or other downstream nodes 820 connected to the first CU 810 that are causing interference experienced at the victim downstream nodes 825 (e.g., aggressor downstream nodes 820 causing CLI that equals, exceeds, or otherwise satisfies a threshold). Additionally, or alternatively, the feedback may indicate one or more identifiers that represent potential sources of CLI that satisfies (e.g., equals or exceeds) a threshold. For example, in some aspects, the feedback provided from the second CU 815 to the first CU 810 may indicate one or more UE identifiers, one or more cell identifiers, one or more CLI-RSSI identifiers, one or more uplink reference signal identifiers, one or more downlink reference signal identifiers, and/or one or more resources that represent sources of CLI that satisfies a threshold.

Accordingly, as further shown in FIG. 8B, and by reference number 865, the first CU 810 and the second CU 815 may perform one or more actions to mitigate the CLI that the aggressor downstream nodes 820 may be causing at the victim downstream nodes 820. For example, the first CU 810 and the second CU 815 may align a transmit schedule of the aggressor downstream nodes 820 to avoid one or more TTIs in which the victim downstream nodes 825 are scheduled to receive transmissions such that transmissions by the aggressor downstream nodes 820 do not interfere with reception by the victim downstream nodes 825. As another example, the first CU 810 and the second CU 815 may configure TDD patterns for the downstream nodes 820 connected to the first CU 810 and the downstream nodes 825 connected to the second CU 815 such that the downstream nodes 820 connected to the first CU 810 and the downstream nodes 825 connected to the second CU 815 transmit at similar times and/or receive at similar times.

As another example, the first CU 810 may adjust (e.g., reduce) a transmit power of one or more downstream nodes 820 to mitigate the CLI experienced by the one or more downstream nodes 825 connected to the second CU 815. As another example, the first CU 810 and/or the second CU 815 may configure one or more handover parameters (e.g., cell reselection criteria) for the downstream nodes 820, 825 to mitigate the CLI, may indicate TDD configurations of neighboring cells to downstream DUs such that the downstream DUs can make scheduling decisions to mitigate potential CLI, and/or the like. In this way, the first CU 810 and the second CU 815 may communicate inter-CU signaling over the Xn interface to coordinate efforts to detect and/or mitigate CLI that may be caused by downstream nodes 820, 825 connected to the respective CUs 810, 815 and/or to detect and/or mitigate CLI that may be experienced by downstream nodes 820, 825 connected to the respective CUs 810, 815.

As indicated above, FIGS. 8A-8B are provided as examples. Other examples may differ from what is described with regard to FIGS. 8A-8B.

Figure 9:
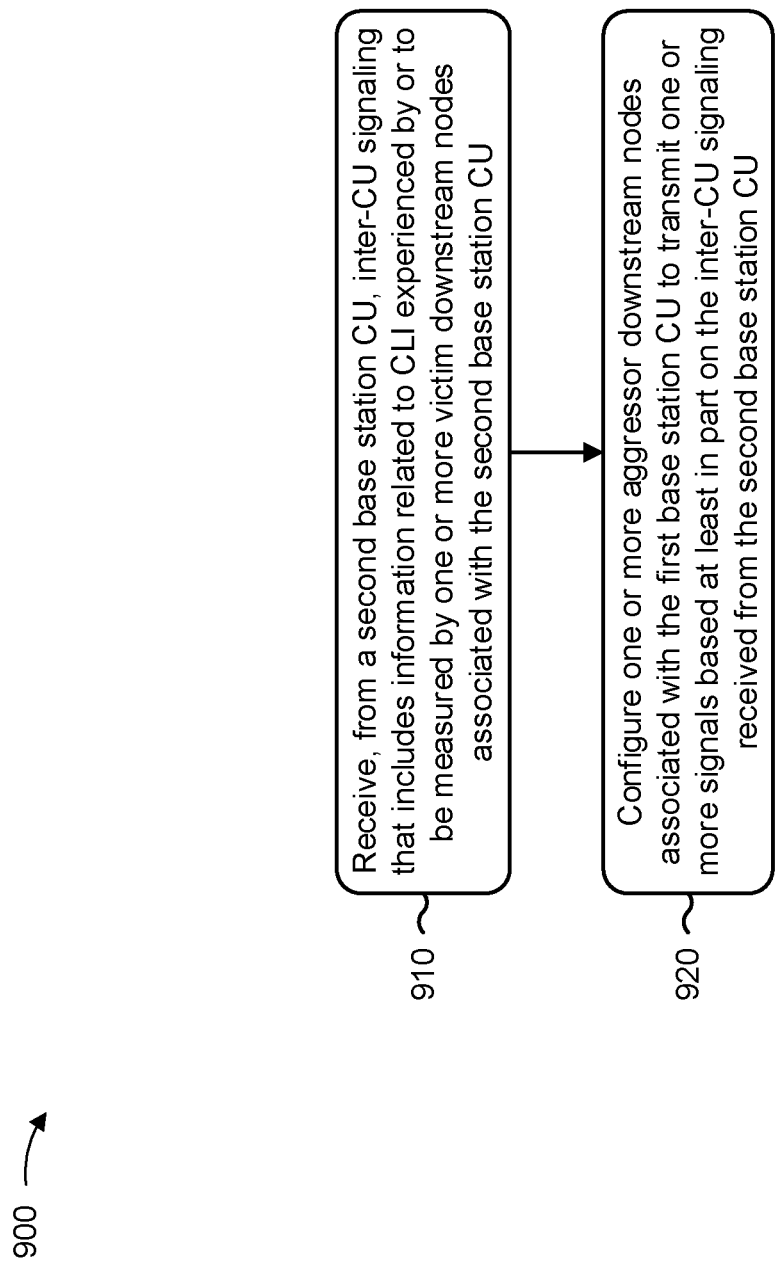
FIGS. 9-10 are diagrams illustrating example processes associated with inter-CU coordination for CLI management, in accordance with the present disclosure.

FIG. 9 is a diagram illustrating an example process 900 performed, for example, by a first base station CU, in accordance with the present disclosure. Example process 900 is an example where the first base station CU (e.g., CU 710, CU 810, and/or CU 815) performs operations associated with inter-CU coordination for CLI management.

As shown in FIG. 9, in some aspects, process 900 may include receiving, from a second base station CU, inter-CU signaling that includes information related to CLI experienced by or to be measured by one or more victim downstream nodes associated with the second base station CU (block 910). For example, the first base station CU (e.g., using reception component 1102, depicted in FIG. 11) may receive, from a second base station CU, inter-CU signaling that includes information related to CLI experienced by or to be measured by one or more victim downstream nodes associated with the second base station CU, as described above.

As further shown in FIG. 9, in some aspects, process 900 may include configuring one or more aggressor downstream nodes associated with the first base station CU to transmit one or more signals based at least in part on the inter-CU signaling received from the second base station CU (block 920). For example, the first base station CU (e.g., using configuration component 1108, depicted in FIG. 11) may configure one or more aggressor downstream nodes associated with the first base station CU to transmit one or more signals based at least in part on the inter-CU signaling received from the second base station CU, as described above.

Process 900 may include additional aspects, such as any single aspect or any combination of aspects described below and/or in connection with one or more other processes described elsewhere herein.

In a first aspect, process 900 includes transmitting, to the second base station CU, inter-CU signaling indicating a configuration associated with the one or more signals to be transmitted by the one or more aggressor downstream nodes.

In a second aspect, alone or in combination with the first aspect, the inter-CU signaling received from the second base station CU indicates time and/or frequency resources that the one or more victim downstream nodes are configured to use to measure the CLI from the one or more aggressor downstream nodes, and the one or more aggressor downstream nodes are configured to transmit the one or more signals based at least in part on the time and/or frequency resources indicated by the second base station CU.

In a third aspect, alone or in combination with one or more of the first and second aspects, the inter-CU signaling received from the second base station CU indicates one or more identifiers associated with the first base station CU that represent potential sources causing the CLI experienced by the one or more victim downstream nodes associated with the second base station CU.

In a fourth aspect, alone or in combination with one or more of the first through third aspects, the one or more identifiers include one or more cell identifiers, UE identifiers, zone identifiers, location identifiers, or spatial region identifiers associated with the first base station CU.

In a fifth aspect, alone or in combination with one or more of the first through fourth aspects, the one or more aggressor downstream nodes associated with the first base station CU are associated with the one or more identifiers that represent potential sources causing the CLI experienced by the one or more victim downstream nodes.

In a sixth aspect, alone or in combination with one or more of the first through fifth aspects, process 900 includes receiving, from the second base station CU, inter-CU signaling that includes feedback related to the CLI measured by the one or more victim downstream nodes.

In a seventh aspect, alone or in combination with one or more of the first through sixth aspects, the feedback includes one or more CLI measurement reports associated with the one or more aggressor downstream nodes potentially causing the CLI experienced by the one or more victim downstream nodes.

In an eighth aspect, alone or in combination with one or more of the first through seventh aspects, the feedback includes one or more identifiers associated with the first base station CU that represent potential sources causing CLI that satisfies a threshold.

In a ninth aspect, alone or in combination with one or more of the first through eighth aspects, process 900 includes performing one or more actions to mitigate the CLI measured by the one or more victim downstream nodes based at least in part on the feedback.

In a tenth aspect, alone or in combination with one or more of the first through ninth aspects, the one or more signals to be transmitted by the one or more aggressor downstream nodes include one or more CLI-RSSI transmissions or one or more reference signal transmissions.

In an eleventh aspect, alone or in combination with one or more of the first through tenth aspects, the one or more aggressor downstream nodes associated with the first base station CU include one or more of a UE, an MT associated with an IAB node, a base station DU, or a DU associated with an IAB node.

In a twelfth aspect, alone or in combination with one or more of the first through eleventh aspects, the inter-CU signaling is received over an Xn interface between the first base station CU and the second base station CU.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
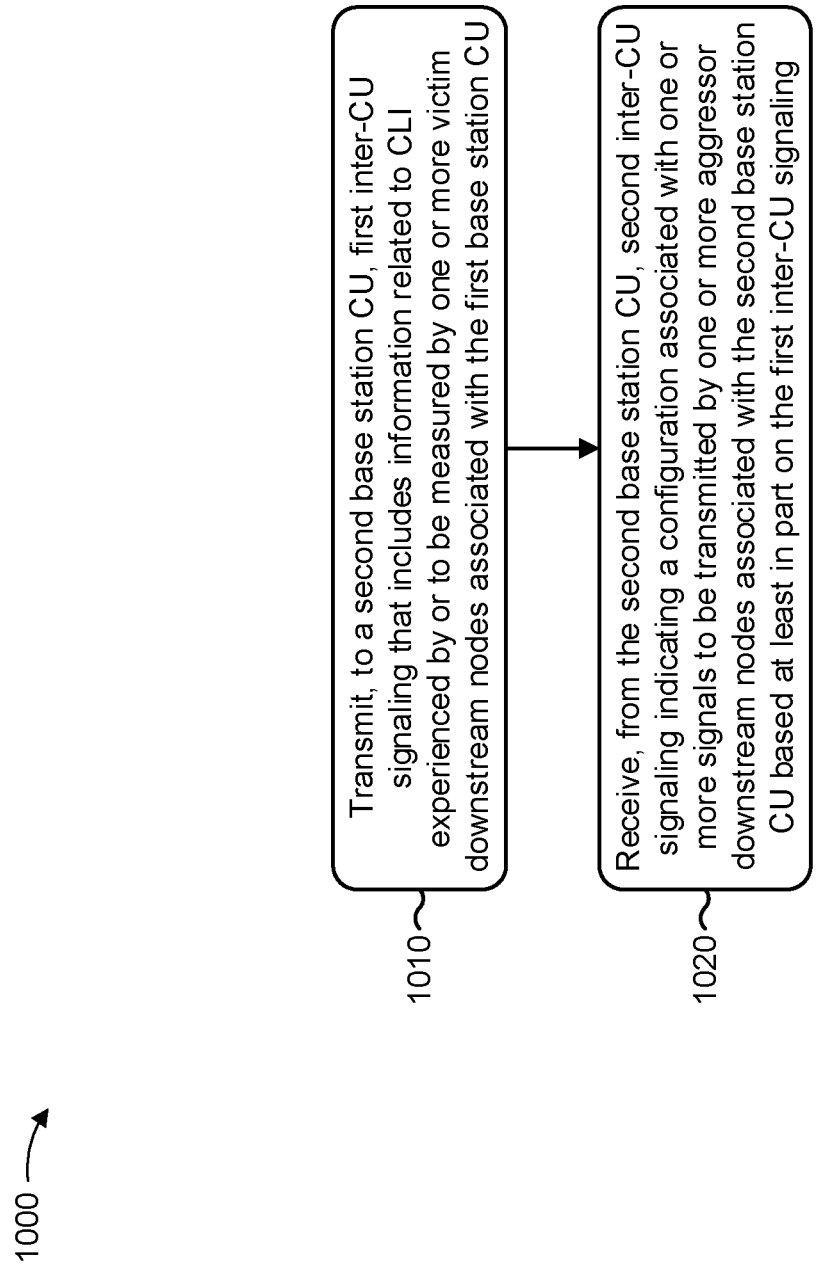

FIG. 10 is a diagram illustrating an example process 1000 performed, for example, by a first base station CU, in accordance with the present disclosure. Example process 1000 is an example where the first base station CU (e.g., CU 710, CU 810, and/or CU 815) performs operations associated with inter-CU coordination for CLI management.

As shown in FIG. 10, in some aspects, process 1000 may include transmitting, to a second base station CU, first inter-CU signaling that includes information related to CLI experienced by or to be measured by one or more victim downstream nodes associated with the first base station CU (block 1010). For example, the first base station CU (e.g., using transmission component 1204, depicted in FIG. 12) may transmit, to a second base station CU, first inter-CU signaling that includes information related to CLI experienced by or to be measured by one or more victim downstream nodes associated with the first base station CU, as described above.

As further shown in FIG. 10, in some aspects, process 1000 may include receiving, from the second base station CU, second inter-CU signaling indicating a configuration associated with one or more signals to be transmitted by one or more aggressor downstream nodes associated with the second base station CU based at least in part on the first inter-CU signaling (block 1020). For example, the first base station CU (e.g., using reception component 1202, depicted in FIG. 12) may receive, from the second base station CU, second inter-CU signaling indicating a configuration associated with one or more signals to be transmitted by one or more aggressor downstream nodes associated with the second base station CU based at least in part on the first inter-CU signaling, as described above.

Process 1000 may include additional aspects, such as any single aspect or any combination of aspects described below and/or in connection with one or more other processes described elsewhere herein.

In a first aspect, process 1000 includes configuring the one or more victim downstream nodes to perform one or more CLI measurements based at least in part on the second inter-CU signaling.

In a second aspect, alone or in combination with the first aspect, the first inter-CU signaling indicates time and/or frequency resources that the one or more victim downstream nodes are configured to use to measure the CLI from the one or more aggressor downstream nodes, and the second inter-CU signaling indicates that the one or more aggressor downstream nodes are configured to transmit the one or more signals based at least in part on the time and/or frequency resources indicated in the first inter-CU signaling.

In a third aspect, alone or in combination with one or more of the first and second aspects, the first inter-CU signaling indicates one or more identifiers associated with the second base station CU that represent potential sources causing the CLI experienced by the one or more victim downstream nodes.

In a fourth aspect, alone or in combination with one or more of the first through third aspects, the one or more identifiers include one or more cell identifiers, UE identifiers, zone identifiers, location identifiers, or spatial region identifiers associated with the second base station CU.

In a fifth aspect, alone or in combination with one or more of the first through fourth aspects, the one or more aggressor downstream nodes are associated with the one or more identifiers that represent potential sources causing the CLI experienced by the one or more victim downstream nodes.

In a sixth aspect, alone or in combination with one or more of the first through fifth aspects, process 1000 includes transmitting, to the second base station CU, inter-CU signaling that includes feedback related to the CLI measured by the one or more victim downstream nodes.

In a seventh aspect, alone or in combination with one or more of the first through sixth aspects, the feedback includes one or more CLI measurement reports associated with the one or more aggressor downstream nodes potentially causing the CLI experienced by the one or more victim downstream nodes.

In an eighth aspect, alone or in combination with one or more of the first through seventh aspects, the feedback includes one or more identifiers associated with the second base station CU that represent potential sources causing CLI that satisfies a threshold.

In a ninth aspect, alone or in combination with one or more of the first through eighth aspects, the one or more signals to be transmitted by the one or more aggressor downstream nodes include one or more CLI-RSSI transmissions or one or more reference signal transmissions.

In a tenth aspect, alone or in combination with one or more of the first through ninth aspects, the one or more aggressor downstream nodes associated with the first base station CU include one or more of a UE, an MT associated with an IAB node, a base station DU, or a DU associated with an IAB node.

In an eleventh aspect, alone or in combination with one or more of the first through tenth aspects, the inter-CU signaling is received over an Xn interface between the first base station CU and the second base station CU.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
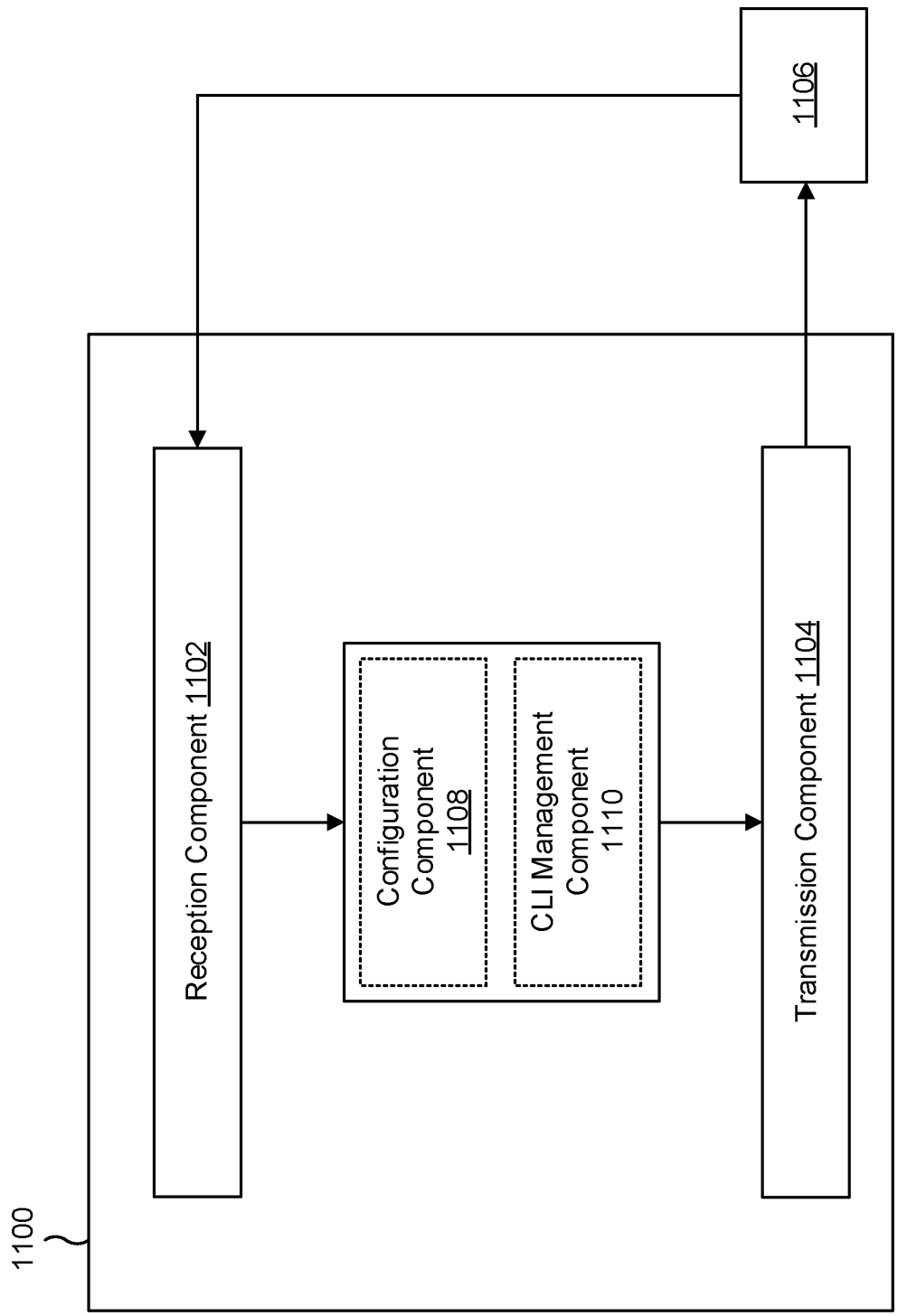
FIGS. 11-12 are block diagrams of example apparatuses for wireless communication, in accordance with the present disclosure.

FIG. 11 is a block diagram of an example apparatus 1100 for wireless communication. The apparatus 1100 may be a first base station CU, or a first base station CU may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station DU, another base station CU, or another wireless communication device) using the reception component 1102 and the transmission component 1104. As further shown, the apparatus 1100 may include one or more of a configuration component 1108 or a CLI management component 1110, among other examples.

In some aspects, the apparatus 1100 may be configured to perform one or more operations described herein in connection with FIGS. 8A-8B. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive, from a second base station CU, inter-CU signaling that includes information related to CLI experienced by or to be measured by one or more victim downstream nodes associated with the second base station CU. The configuration component 1108 may configure one or more aggressor downstream nodes associated with the apparatus 1100 to transmit one or more signals based at least in part on the inter-CU signaling received from the second base station CU. In some aspects, the configuration component 1108 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The transmission component 1104 may transmit, to the second base station CU, inter-CU signaling indicating a configuration associated with the one or more signals to be transmitted by the one or more aggressor downstream nodes.

The reception component 1102 may receive, from the second base station CU, inter-CU signaling that includes feedback related to the CLI measured by the one or more victim downstream nodes.

The CLI management component 1110 may perform one or more actions to mitigate the CLI measured by the one or more victim downstream nodes based at least in part on the feedback. In some aspects, the CLI management component 1110 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
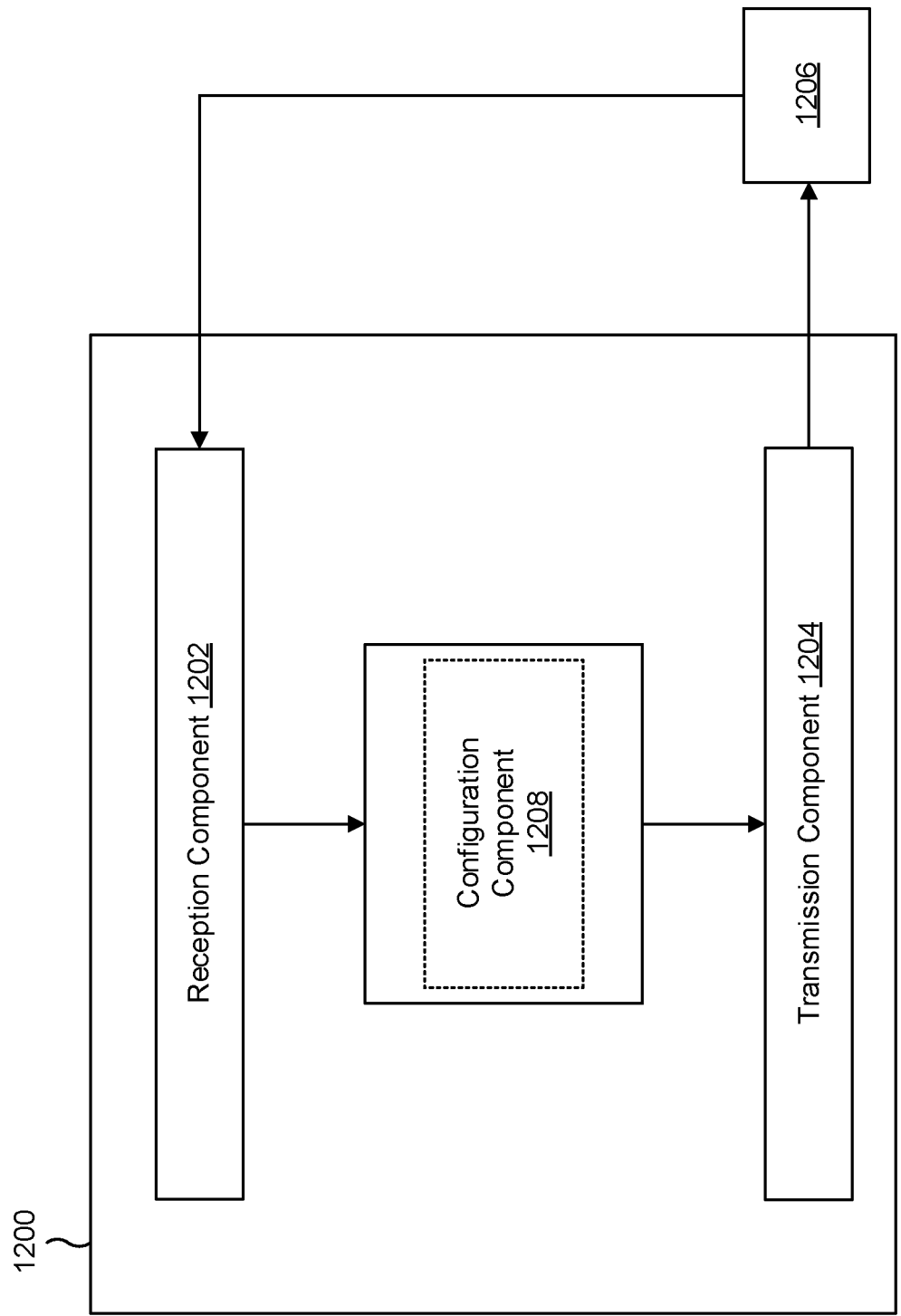

FIG. 12 is a block diagram of an example apparatus 1200 for wireless communication. The apparatus 1200 may be a first base station CU, or a first base station CU may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station DU, another base station CU, or another wireless communication device) using the reception component 1202 and the transmission component 1204. As further shown, the apparatus 1200 may include a configuration component 1208, among other examples.

In some aspects, the apparatus 1200 may be configured to perform one or more operations described herein in connection with FIGS. 8A-8B. Additionally, or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit, to a second base station CU, first inter-CU signaling that includes information related to CLI experienced by or to be measured by one or more victim downstream nodes associated with the apparatus 1200. The reception component 1202 may receive, from the second base station CU, second inter-CU signaling indicating a configuration associated with one or more signals to be transmitted by one or more aggressor downstream nodes associated with the second base station CU based at least in part on the first inter-CU signaling.

The configuration component 1208 may configure the one or more victim downstream nodes to perform one or more CLI measurements based at least in part on the second inter-CU signaling. In some aspects, the configuration component 1208 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The transmission component 1204 may transmit, to the second base station CU, inter-CU signaling that includes feedback related to the CLI measured by the one or more victim downstream nodes.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first base station CU, comprising: receiving, from a second base station CU, inter-CU signaling that includes information related to CLI experienced by or to be measured by one or more victim downstream nodes associated with the second base station CU; and configuring one or more aggressor downstream nodes associated with the first base station CU to transmit one or more signals based at least in part on the inter-CU signaling received from the second base station CU.

Aspect 2: The method of Aspect 1, further comprising: transmitting, to the second base station CU, inter-CU signaling indicating a configuration associated with the one or more signals to be transmitted by the one or more aggressor downstream nodes.

Aspect 3: The method of any of Aspects 1-2, wherein: the inter-CU signaling received from the second base station CU indicates time and/or frequency resources that the one or more victim downstream nodes are configured to use to measure the CLI from the one or more aggressor downstream nodes, and the one or more aggressor downstream nodes are configured to transmit the one or more signals based at least in part on the time and/or frequency resources indicated by the second base station CU.

Aspect 4: The method of any of Aspects 1-3, wherein the inter-CU signaling received from the second base station CU indicates one or more identifiers associated with the first base station CU that represent potential sources causing the CLI experienced by the one or more victim downstream nodes associated with the second base station CU.

Aspect 5: The method of Aspect 4, wherein the one or more identifiers include one or more cell identifiers, UE identifiers, zone identifiers, location identifiers, or spatial region identifiers associated with the first base station CU.

Aspect 6: The method of any of Aspects 4-5, wherein the one or more aggressor downstream nodes associated with the first base station CU are associated with the one or more identifiers that represent potential sources causing the CLI experienced by the one or more victim downstream nodes.

Aspect 7: The method of any of Aspects 1-6, further comprising: receiving, from the second base station CU, inter-CU signaling that includes feedback related to the CLI measured by the one or more victim downstream nodes.

Aspect 8: The method of Aspect 7, wherein the feedback includes one or more CLI measurement reports associated with the one or more aggressor downstream nodes potentially causing the CLI experienced by the one or more victim downstream nodes.

Aspect 9: The method of any of Aspects 7-8, wherein the feedback includes one or more identifiers associated with the first base station CU that represent potential sources causing CLI that satisfies a threshold.

Aspect 10: The method of any of Aspects 7-9, further comprising: performing one or more actions to mitigate the CLI measured by the one or more victim downstream nodes based at least in part on the feedback.

Aspect 11: The method of any of Aspects 1-10, wherein the one or more signals to be transmitted by the one or more aggressor downstream nodes include one or more CLI-RSSI transmissions or one or more reference signal transmissions.

Aspect 12: The method of any of Aspects 1-11, wherein the one or more aggressor downstream nodes associated with the first base station CU include one or more of a UE, an MT associated with an IAB node, a base station DU, or a DU associated with an IAB node.

Aspect 13: The method of any of Aspects 1-12, wherein the inter-CU signaling is received over an Xn interface between the first base station CU and the second base station CU.

Aspect 14: A method of wireless communication performed by a first base station CU, comprising: transmitting, to a second base station CU, first inter-CU signaling that includes information related to CLI experienced by or to be measured by one or more victim downstream nodes associated with the first base station CU; and receiving, from the second base station CU, second inter-CU signaling indicating a configuration associated with one or more signals to be transmitted by one or more aggressor downstream nodes associated with the second base station CU based at least in part on the first inter-CU signaling.

Aspect 15: The method of Aspect 14, further comprising: configuring the one or more victim downstream nodes to perform one or more CLI measurements based at least in part on the second inter-CU signaling.

Aspect 16: The method of any of Aspects 14-15, wherein: the first inter-CU signaling indicates time and/or frequency resources that the one or more victim downstream nodes are configured to use to measure the CLI from the one or more aggressor downstream nodes, and the second inter-CU signaling indicates that the one or more aggressor downstream nodes are configured to transmit the one or more signals based at least in part on the time and/or frequency resources indicated in the first inter-CU signaling.

Aspect 17: The method of any of Aspects 14-16, wherein the first inter-CU signaling indicates one or more identifiers associated with the second base station CU that represent potential sources causing the CLI experienced by the one or more victim downstream nodes.

Aspect 18: The method of Aspect 17, wherein the one or more identifiers include one or more cell identifiers, UE identifiers, zone identifiers, location identifiers, or spatial region identifiers associated with the second base station CU.

Aspect 19: The method of any of Aspects 17-18, wherein the one or more aggressor downstream nodes are associated with the one or more identifiers that represent potential sources causing the CLI experienced by the one or more victim downstream nodes.

Aspect 20: The method of any of Aspects 14-19, further comprising: transmitting, to the second base station CU, inter-CU signaling that includes feedback related to the CLI measured by the one or more victim downstream nodes.

Aspect 21: The method of Aspect 20, wherein the feedback includes one or more CLI measurement reports associated with the one or more aggressor downstream nodes potentially causing the CLI experienced by the one or more victim downstream nodes.

Aspect 22: The method of any of Aspects 20-21, wherein the feedback includes one or more identifiers associated with the second base station CU that represent potential sources causing CLI that satisfies a threshold.

Aspect 23: The method of any of Aspects 14-22, wherein the one or more signals to be transmitted by the one or more aggressor downstream nodes include one or more CLI-RSSI transmissions or one or more reference signal transmissions.

Aspect 24: The method of any of Aspects 14-23, wherein the one or more aggressor downstream nodes associated with the first base station CU include one or more of a UE, an MT associated with an IAB node, a base station DU, or a DU associated with an IAB node.

Aspect 25: The method of any of Aspects 14-24, wherein the inter-CU signaling is received over an Xn interface between the first base station CU and the second base station CU.

Aspect 26: An apparatus for wireless communication at a device, comprising a processor; memory coupled with the processor; and instructions stored in the memory and executable by the processor to cause the apparatus to perform the method of one or more of Aspects 1-13.

Aspect 27: A device for wireless communication, comprising a memory and one or more processors coupled to the memory, the one or more processors configured to perform the method of one or more of Aspects 1-13.

Aspect 28: An apparatus for wireless communication, comprising at least one means for performing the method of one or more of Aspects 1-13.

Aspect 29: A non-transitory computer-readable medium storing code for wireless communication, the code comprising instructions executable by a processor to perform the method of one or more of Aspects 1-13.

Aspect 30: A non-transitory computer-readable medium storing a set of instructions for wireless communication, the set of instructions comprising one or more instructions that, when executed by one or more processors of a device, cause the device to perform the method of one or more of Aspects 1-13.

Aspect 31: An apparatus for wireless communication at a device, comprising a processor; memory coupled with the processor; and instructions stored in the memory and executable by the processor to cause the apparatus to perform the method of one or more of Aspects 14-25.

Aspect 32: A device for wireless communication, comprising a memory and one or more processors coupled to the memory, the one or more processors configured to perform the method of one or more of Aspects 14-25.

Aspect 33: An apparatus for wireless communication, comprising at least one means for performing the method of one or more of Aspects 14-25.

Aspect 34: A non-transitory computer-readable medium storing code for wireless communication, the code comprising instructions executable by a processor to perform the method of one or more of Aspects 14-25.

Aspect 35: A non-transitory computer-readable medium storing a set of instructions for wireless communication, the set of instructions comprising one or more instructions that, when executed by one or more processors of a device, cause the device to perform the method of one or more of Aspects 14-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first base station central unit (CU) for wireless communication, comprising:
    a memory; and
    one or more processors, coupled to the memory, configured to:
        receive, from a second base station CU, inter-CU signaling that includes information related to cross-link interference (CLI) experienced by or to be measured by one or more victim downstream nodes associated with the second base station CU, the inter-CU signaling indicating time and/or frequency resources that the one or more victim downstream nodes are configured to use to measure CLI; and
        configure one or more aggressor downstream nodes associated with the first base station CU to transmit one or more signals for CLI measurements by the one or more victim downstream nodes based at least in part on the time and/or frequency resources indicated by the inter-CU signaling received from the second base station CU.

2. The first base station CU of claim 1, wherein the one or more processors are further configured to:
    transmit, to the second base station CU, inter-CU signaling indicating a configuration associated with the one or more signals to be transmitted by the one or more aggressor downstream nodes.

3. The first base station CU of claim 1, wherein the inter-CU signaling received from the second base station CU indicates one or more identifiers associated with the first base station CU that represent potential sources causing the CLI experienced by the one or more victim downstream nodes associated with the second base station CU.

4. The first base station CU of claim 3, wherein the one or more identifiers include one or more cell identifiers, user equipment identifiers, zone identifiers, location identifiers, or spatial region identifiers associated with the first base station CU.

5. The first base station CU of claim 3, wherein the one or more aggressor downstream nodes associated with the first base station CU are associated with the one or more identifiers that represent potential sources causing the CLI experienced by the one or more victim downstream nodes.

6. The first base station CU of claim 1, wherein the one or more processors are further configured to:
  receive, from the second base station CU, inter-CU signaling that includes feedback related to the CLI measured by the one or more victim downstream nodes.

7. The first base station CU of claim 6, wherein the feedback includes one or more CLI measurement reports associated with the one or more aggressor downstream nodes potentially causing the CLI experienced by the one or more victim downstream nodes.

8. The first base station CU of claim 6, wherein the feedback includes one or more identifiers associated with the first base station CU that represent potential sources causing CLI that satisfies a threshold.

9. The first base station CU of claim 6, wherein the one or more processors are further configured to:
  perform one or more actions to mitigate the CLI measured by the one or more victim downstream nodes based at least in part on the feedback.

10. The first base station CU of claim 1, wherein the one or more signals to be transmitted by the one or more aggressor downstream nodes include one or more CLI received signal strength indicator transmissions or one or more reference signal transmissions.

11. The first base station CU of claim 1, wherein the one or more aggressor downstream nodes associated with the first base station CU include one or more of a user equipment, a mobile terminal associated with an integrated access and backhaul (IAB) node, a base station distributed unit (DU), or a DU associated with an IAB node.

12. The first base station CU of claim 1, wherein the inter-CU signaling is received over an Xn interface between the first base station CU and the second base station CU.

13. A first base station central unit (CU) for wireless communication, comprising:
  a memory; and
  one or more processors, coupled to the memory, configured to:
    transmit, to a second base station CU, first inter-CU signaling that includes information related to cross-link interference (CLI) experienced by or to be measured by one or more victim downstream nodes associated with the first base station CU, the inter-CU signaling indicating time and/or frequency resources that the one or more victim downstream nodes are configured to use to measure CLI; and
    receive, from the second base station CU, second inter-CU signaling indicating a configuration associated with one or more signals for CLI measurements by the one or more victim downstream nodes to be transmitted by one or more aggressor downstream nodes associated with the second base station CU based at least in part on the time and/or frequency resources indicated by the first inter-CU signaling.

14. The first base station CU of claim 13, wherein the one or more processors are further configured to:
  configure the one or more victim downstream nodes to perform one or more CLI measurements based at least in part on the second inter-CU signaling.

15. The first base station CU of claim 13, wherein the first inter-CU signaling indicates one or more identifiers associated with the second base station CU that represent potential sources causing the CLI experienced by the one or more victim downstream nodes.

16. The first base station CU of claim 15, wherein the one or more identifiers include one or more cell identifiers, user equipment identifiers, zone identifiers, location identifiers, or spatial region identifiers associated with the second base station CU.

17. The first base station CU of claim 15, wherein the one or more aggressor downstream nodes are associated with the one or more identifiers that represent potential sources causing the CLI experienced by the one or more victim downstream nodes.

18. The first base station CU of claim 13, wherein the one or more processors are further configured to:
  transmit, to the second base station CU, inter-CU signaling that includes feedback related to the CLI measured by the one or more victim downstream nodes.

19. The first base station CU of claim 18, wherein the feedback includes one or more CLI measurement reports associated with the one or more aggressor downstream nodes potentially causing the CLI experienced by the one or more victim downstream nodes.

20. The first base station CU of claim 18, wherein the feedback includes one or more identifiers associated with the second base station CU that represent potential sources causing CLI that satisfies a threshold.

21. The first base station CU of claim 13, wherein the one or more signals to be transmitted by the one or more aggressor downstream nodes include one or more CLI received signal strength indicator transmissions or one or more reference signal transmissions.

22. The first base station CU of claim 13, wherein the one or more aggressor downstream nodes associated with the first base station CU include one or more of a user equipment, a mobile terminal associated with an integrated access and backhaul (IAB) node, a base station distributed unit (DU), or a DU associated with an IAB node.

23. The first base station CU of claim 13, wherein the inter-CU signaling is received over an Xn interface between the first base station CU and the second base station CU.

24. A method of wireless communication performed by a first base station central unit (CU), comprising:
  receiving, from a second base station CU, inter-CU signaling that includes information related to cross-link interference (CLI) experienced by or to be measured by one or more victim downstream nodes associated with the second base station CU, the inter-CU signaling indicating time and/or frequency resources that the one or more victim downstream nodes are configured to use to measure CLI; and
  configuring one or more aggressor downstream nodes associated with the first base station CU to transmit one or more signals for CLI measurements by the one or more victim downstream nodes based at least in part on the time and/or frequency resources indicated by the inter-CU signaling received from the second base station CU.

25. The method of claim 24, further comprising:
  transmitting, to the second base station CU, inter-CU signaling indicating a configuration associated with the one or more signals to be transmitted by the one or more aggressor downstream nodes.

26. The method of claim 24, wherein the inter-CU signaling received from the second base station CU indicates one or more identifiers associated with the first base station CU that represent potential sources causing the CLI experienced by the one or more victim downstream nodes associated with the second base station CU.

27. The method of claim 24, further comprising:
receiving, from the second base station CU, inter-CU signaling that includes feedback related to the CLI measured by the one or more victim downstream nodes.

28. A method of wireless communication performed by a first base station central unit (CU), comprising:
transmitting, to a second base station CU, first inter-CU signaling that includes information related to cross-link interference (CLI) experienced by or to be measured by one or more victim downstream nodes associated with the first base station CU, the inter-CU signaling indicating time and/or frequency resources that the one or more victim downstream nodes are configured to use to measure CLI; and
receiving, from the second base station CU, second inter-CU signaling indicating a configuration associated with one or more signals for CLI measurements by the one or more victim downstream nodes to be transmitted by one or more aggressor downstream nodes associated with the second base station CU based at least in part on the time and/or frequency resources indicated by the first inter-CU signaling.

29. The method of claim 28, further comprising:
configuring the one or more victim downstream nodes to perform one or more CLI measurements based at least in part on the second inter-CU signaling.

30. The method of claim 28, further comprising:
transmitting, to the second base station CU, inter-CU signaling that includes feedback related to the CLI measured by the one or more victim downstream nodes.

* * * * *